US010486091B2

(12) United States Patent
Adamson et al.

(10) Patent No.: US 10,486,091 B2
(45) Date of Patent: Nov. 26, 2019

(54) CONTINUOUS BELT SCREEN

(71) Applicant: Bilfinger Water Technologies, Inc., New Brighton, MN (US)

(72) Inventors: Grant Christopher Adamson, Nabiac (AU); Ross Van Someren, Wavell Heights (AU); Steven Gregory Bailey, Bald Hills (AU); Michael James Mcinnes, Enoggera (AU)

(73) Assignee: Aqseptence Group, Inc., New Brighton, MN (US)

( * ) Notice: Subject to any disclaimer, the term of this patent is extended or adjusted under 35 U.S.C. 154(b) by 697 days.

(21) Appl. No.: 14/895,402

(22) PCT Filed: Jun. 3, 2014

(86) PCT No.: PCT/US2014/040691
§ 371 (c)(1),
(2) Date: Dec. 2, 2015

(87) PCT Pub. No.: WO2014/197468
PCT Pub. Date: Dec. 11, 2014

(65) Prior Publication Data
US 2016/0114268 A1    Apr. 28, 2016

Related U.S. Application Data

(60) Provisional application No. 61/830,519, filed on Jun. 3, 2013.

(51) Int. Cl.
*B01D 33/04*    (2006.01)
*B01D 33/333*    (2006.01)

(52) U.S. Cl.
CPC ........... *B01D 33/04* (2013.01); *B01D 33/333* (2013.01)

(58) Field of Classification Search
CPC .............................. B01D 33/04; B01D 33/333
(Continued)

(56) References Cited

U.S. PATENT DOCUMENTS 1,207,376 A    12/1916    Davidson
1,864,359 A    6/1932    Laughlin et al.
(Continued)

FOREIGN PATENT DOCUMENTS

JP    11-13841    1/1999

OTHER PUBLICATIONS

International Bureau, International Preliminary Report on Patentability, dated Dec. 8, 2015, for PCT/US2014/040691, 9 pages.
(Continued)

*Primary Examiner* — Robert Clemente
*Assistant Examiner* — Akash K Varma
(74) *Attorney, Agent, or Firm* — Patterson Thuente Pedersen, P.A.

(57) ABSTRACT

A continuous belt screen assembly and system used for filtering fluid for various municipal and industrial purposes. The assembly includes a pair of spaced, endless belts, lifters, and screen panels. Each lifter is operably mounted to the pair of belts for lifting of solid waste out of the fluid in the channel. Each of the screen panels can be interposed between lifters and secured in place by opposing slots defined by the lifters. The endless belts can include toothed drive links, with the ends of the teeth extending with the ends of the drive links to define an involute profile. The lifters can include a sleeve portion for receiving a pivot shaft and a paddle portion extending from the sleeve portion, terminating at a free end that can be contoured to have teeth. The lifters can be a flexible material configured to deflect.

16 Claims, 15 Drawing Sheets

(58) Field of Classification Search
USPC .......................................................... 210/324
See application file for complete search history.

(56) References Cited

U.S. PATENT DOCUMENTS

| | | |
|---|---|---|
| 2,095,504 A | 10/1937 | Kesti et al. |
| 7,344,638 B2 | 3/2008 | Conroy, Jr. |
| 7,364,652 B2 | 4/2008 | Middleton |
| 2007/0215539 A1* | 9/2007 | Conroy .................. B01D 33/37 |
| | | 210/400 |

OTHER PUBLICATIONS

Japanese Office Action and English Translation for Patent Application No. 2016-518407, dated Jan. 23, 2018, 5 pages.
International Bureau, International Search Report dated Dec. 5, 2014, for PCT/US2014/040691, 4 pages.
Bormet, Continuous Belt Screen, Screens Handling, retrieved from the internet on Jun. 3, 2013, 1 page.
ASTIM, Products, Continuous Belt Screen, retrieved from the internet on Jun. 3, 2013, 1 page.
Siemens, Through Flow Traveling Water Screen, retrieved from the internet on Jun. 3, 2013, 2 pages.

* cited by examiner

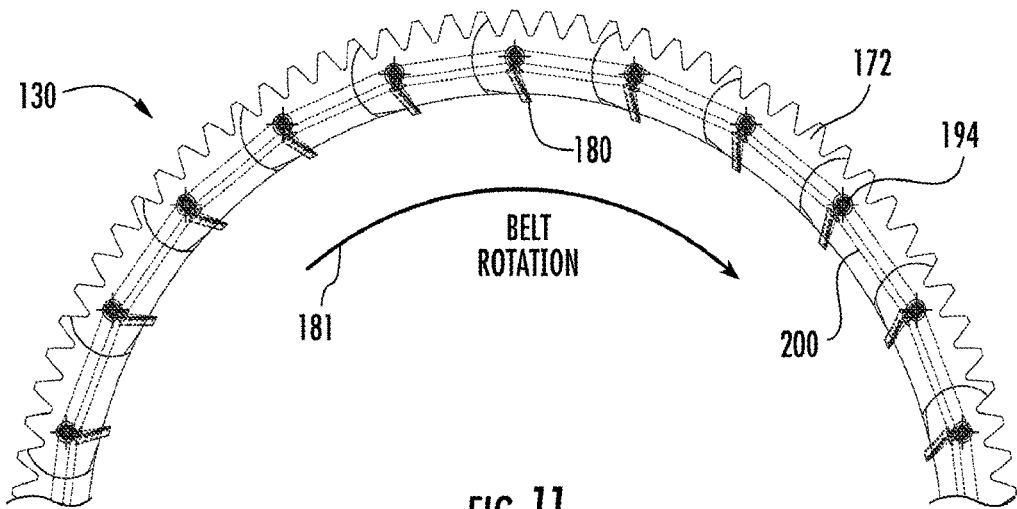
FIG. 11
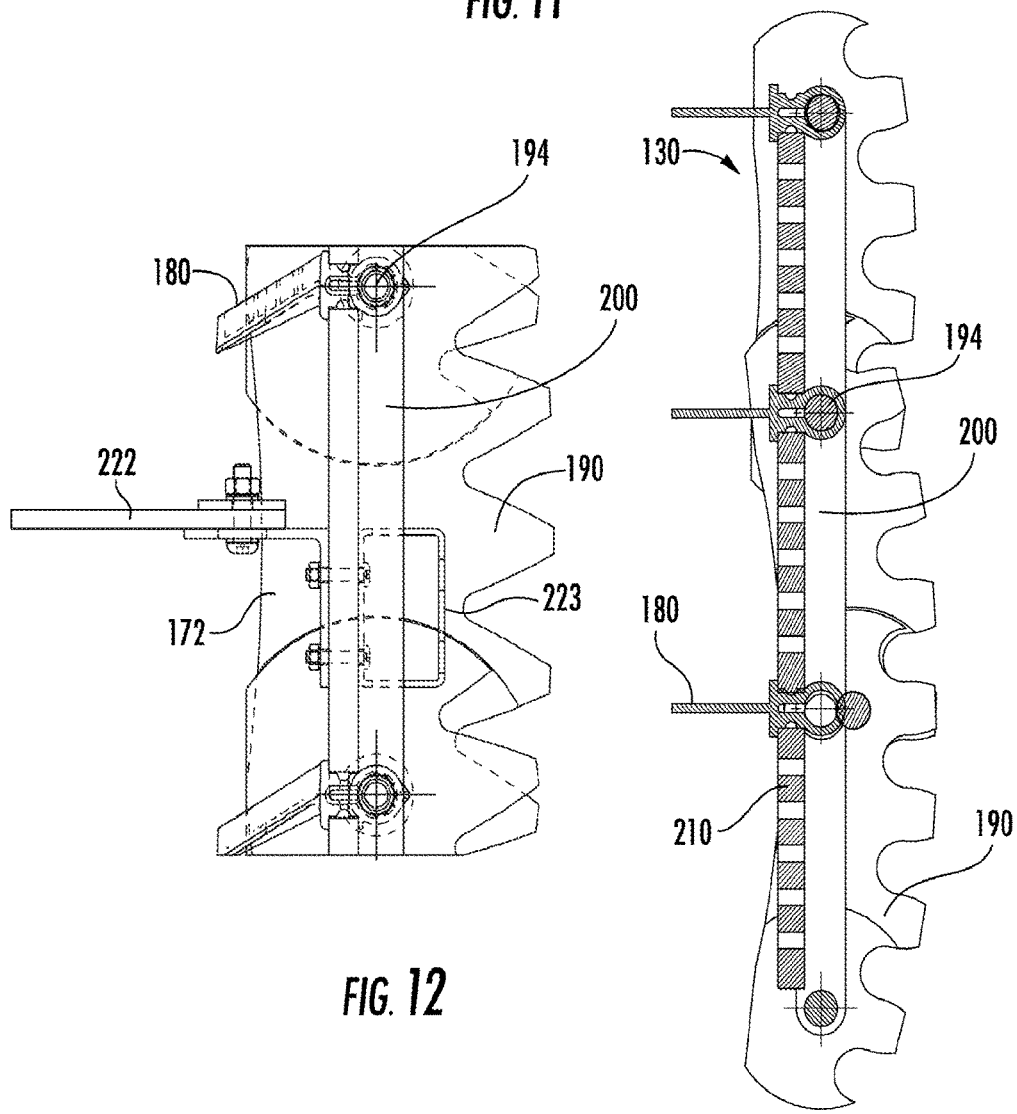
FIG. 12
FIG. 13

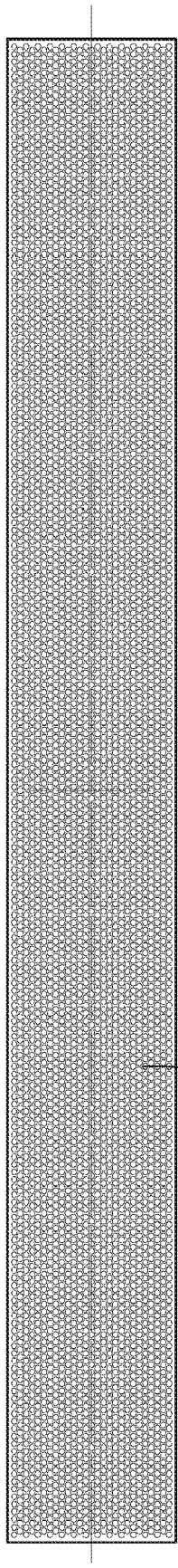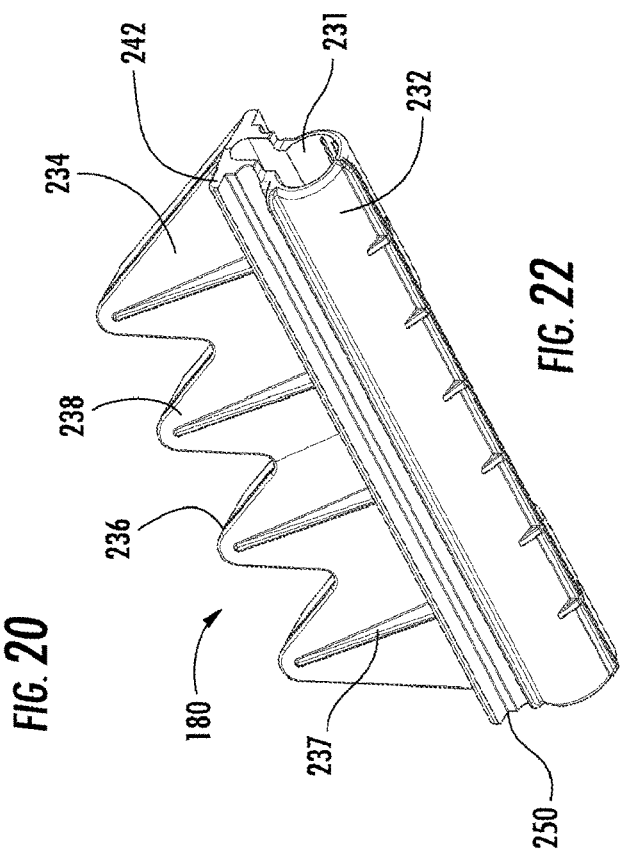

CONTINUOUS BELT SCREEN

CROSS REFERENCE TO RELATED APPLICATION

This application claims priority from U.S. Provisional Patent Application No. 61/830,519, filed on Jun. 3, 2013, and entitled "CONTINUOUS BELT SCREEN," the contents of which are hereby incorporated by reference in their entirety.

FIELD

In general, embodiments herein disclosed relate to systems and methods for extracting solid waste from a fluid. More specifically, the systems and methods may be directed to screening of water, wastewater, industrial wastewater, and other fluids that contain solid waste, and may improve downstream treatment processes.

BACKGROUND

Belt screen assemblies are used to filter intake fluid for various municipal and industrial purposes. The fluid is typically water or wastewater, but other fluids can be filtered. The fluid passes through a belt screen assembly, with any debris greater than the size of perforations in screen panels on the belt screen retained on an inside surface of the belt screen. The belt screen travels upwards, and at or near its peak is configured to allow the debris to fall away from the screen. The belt screen then travels through a cleaning system to remove remaining material that adheres to them.

Screen panels of belt screen assemblies sometimes need to be replaced or removed for repair or maintenance processes. The belt screen assembly may include of a set of individual screen panels that require interconnecting elements to join them together. Replacement or removal of individual screen panels or other elements of the belt screen assembly may not be possible to perform with the equipment installed in its place of operation, which may be a channel, often requiring removal of the entire system and lengthy shutdown events.

SUMMARY

In accordance with one embodiment disclosed herein, a continuous belt screen assembly for removal of solid waste from fluid in a channel is provided. The assembly includes a pair of spaced, opposing endless belts, and plurality of lifters, and a plurality of screen panels. Each lifter is operably mounted to the pair of belts and is configured for lifting of solid waste out of the fluid in the channel. Each of the screen panels is interposed between a pair of lifters and secured in place by engagement with the lifters.

In some embodiments and in combination with the above embodiment, a plurality of pivot shafts extends between the endless belts, with each pivot shaft having two ends, and at least one lifter is pivotally mounted to each pivot shaft. In some such embodiments, each lifter defines two slots parallel to the pivot shafts and on opposite sides of the lifter, such that slots from adjacent lifters open towards each other, and the plurality of screen panels are received in the slots to be secured in place. In some such embodiments, the screen panels are secured in place in the slots by being physically blocked by the walls of the slots. In some embodiments and in combination with any of the above embodiments, the screen panels may be released from the slots by releasing tension on the endless belt and manipulation of the lifters and screen panels.

In some embodiments and in combination with any of the above embodiments, each endless belt comprises a plurality of drive links each defining an aperture at each end, and each aperture receives a pivot shaft such that one endless belt is positioned at one end of each pivot shaft and the other endless belt is positioned at the other end of each respective pivot shaft. In some such embodiments, each drive link defines a toothed surface configured for engagement with a toothed drive gear to cause rotation of the endless belts, and wherein the ends of the teeth of the toothed surface of the drive link extend to define an involute profile.

In some embodiments and in combination with any of the above embodiments, the assembly includes a plurality of belt links having two ends, and the ends of each belt link are each mounted to adjacent pivot shafts. Each belt link is substantially perpendicular to the pivot shaft to which the respective belt link is mounted. In some such embodiments, there is a plurality of lifters that receive each pivot shaft in pivotal engagement. In some such embodiments, adjacent lifters mounted to a pivot shaft have an end of a belt link interposed therebetween.

In some embodiments and in combination with any of the above embodiments, the lifters include a sleeve portion for receiving the pivot shaft and a paddle portion extending from the sleeve portion and terminating at a free end. In some such embodiments, the paddle portion of the lifter defines a contoured edge opposite the sleeve portion. In some such embodiments, the contoured edge of the paddle portion forms teeth. In some embodiments and in combination with any of the above embodiments, the lifter comprises a flexible material configured to deflect as the belt screen assembly travels around a curved path. In some such embodiments, the flexible material has a Shore A Durometer of approximately 70 to approximately 90. In some embodiments and in combination with any of the above embodiments, the flexible material comprises polyurethane.

In accordance with another embodiment disclosed herein, another continuous belt screen assembly for removal of solid waste from fluid in a channel is provided. The assembly includes a pair of spaced, opposing endless belts, a plurality of lifters, and a plurality of screen panels. Each lifter is operably mounted to the pair of belts and configured for lifting of solid waste out of the fluid in the channel, and the lifters each define a contoured free end or edge. Each screen panel is interposed between a pair of lifters and operably mounted to the endless belts. In some such embodiments, the lifters each comprise a sleeve portion for receiving a pivot shaft and a paddle portion extending from the sleeve portion and terminating at the free end or edge, opposite the sleeve portion, each pivot shaft including one end engaging one endless belt and another end engaging the other endless belt. In some such embodiments, the contoured edge of the paddle portion forms teeth. In some such embodiments, the lifter comprises a flexible material configured to deflect as the belt screen assembly travels around a curved path. In some such embodiments, the flexible material has a Shore A Durometer of approximately 70 to approximately 90 and may be polyurethane.

In accordance with another embodiment disclosed herein, lifter for a continuous belt screen assembly for removal of solid waste from fluid in a channel is provided. The lifter includes a sleeve portion configured for receiving a shaft, and a paddle portion extending from the sleeve portion and defining a contoured end or edge, opposite the sleeve portion, the paddle portion configured for lifting solid waste from liquid in the channel. In some such embodiments, the contoured end or edge of the paddle portion forms teeth.

In accordance with another embodiment disclosed herein, another continuous belt screen assembly for removal of solid waste from fluid in a channel is provided. The assembly includes a pair of spaced, opposing endless belts comprising a plurality of drive links, with the drive links each having two ends and defining an aperture at each end. A plurality of pivot shafts is provided, with each pivot shaft including one end engaging one endless belt and another end engaging the other endless belt. The plurality of pivot shafts connects adjacent drive links to form the endless belt, and each aperture receives a pivot shaft such that one endless belt is positioned at one end of each pivot shaft and the other endless belt is positioned at the other end of each respective pivot shaft. Each of a plurality of lifters is pivotally mounted to one of the pivot shafts and configured for lifting of solid waste out of the fluid in the channel. A plurality of screen panels is provided, with each screen panel being interposed between a pair of lifters and operably mounted to the endless belts. Each drive link defines a toothed surface configured for engagement with a toothed drive gear to cause rotation of the endless belts, and the ends of the teeth of the toothed surface of the drive link extend to define an involute profile with the ends of the drive link.

In accordance with another embodiment disclosed herein, a drive link for a continuous belt screen assembly for removal of solid waste from fluid in a channel is provided. The drive link includes a body having two ends and defining an aperture at each end configured for receiving a shaft and connecting to an adjacent drive link. The body further defines a toothed surface configured for engagement with a toothed drive gear to cause rotation of an endless belt of connected drive links. The ends of the teeth of the toothed surface of the drive link extend to define an involute profile with the ends of the drive link.

In accordance with another embodiment disclosed herein, a continuous belt screen system for removal of solid waste from a fluid in a channel is provided. The system includes a support structure comprising a pair of spaced, opposing tracks, and a belt screen assembly. The belt screen assembly includes a pair of spaced, opposing endless belts each received in one of the pair of tracks and comprising a plurality of drive links, with the drive links each having two ends and teeth and defining an aperture at each end. A plurality of pivot shafts is provided, with each pivot shaft including one end engaging one endless belt and another end engaging the other endless belt. The plurality of pivot shafts connects adjacent drive links to form the endless belt. Each aperture receives a pivot shaft such that one endless belt is positioned at one end of each pivot shaft and the other endless belt is positioned at the other end of each respective pivot shaft. A plurality of lifters is provided, with each lifter being pivotally mounted to one of the pivot shafts and configured for lifting of solid waste out of the fluid in the channel, and the lifters each define a contoured free end forming teeth. A plurality of screen panels is provided, with each screen panel being interposed between a pair of lifters and operably mounted to the endless belts. A motor for rotating a drive shaft and gear is provided, with the gear engaging the teeth of the drive links for rotating the endless belts in the tracks. A flume is provided inside a volume defined by the belt screen assembly. The belt screen assembly is configured to rotate within the tracks and collect solid waste on the lifters that when at the top portion of a rotation cycle invert to cause the solid waste to fall into the flume.

In accordance with another embodiment disclosed herein, a method of removing a screen panel from a continuous belt screen assembly for removal of solid waste from fluid in a channel is provided, where the continuous belt screen assembly is a part of a continuous belt screen system. The continuous belt screen system includes a support structure comprising a pair of spaced, opposing tracks and a belt screen assembly. The belt screen assembly includes a pair of spaced, opposing endless belts each received in one of the pair of tracks and including a plurality of drive links. The endless belts are initially under tension and define an interior surface and an exterior surface. A plurality of pivot shafts is provided, with each pivot shaft including one end engaging one endless belt and another end engaging the other endless belt, and the plurality of pivot shafts connect adjacent drive links to form the endless belts. A plurality of lifters is provided, with each lifter being pivotally mounted to one of the pivot shafts and configured for lifting of solid waste out of the fluid in the channel. Each lifter defines two slots parallel to the pivot shafts and on opposite sides of the lifter, such that slots from adjacent lifters open towards each other. A plurality of screen panels is provided, with each screen panel having a length and being interposed between a pair of lifters and secured in place by engagement with the lifters. The plurality of screen panels is secured in place in the slots. The method includes releasing the tension on the endless belts. A screen panel, drive links, and lifters defining slots in which the screen panel is received are rotated in a direction toward the interior of the endless belts to rotate the slots toward the interior. The screen panel is removed from the slots.

BRIEF DESCRIPTION OF THE DRAWINGS

For a more complete understanding, reference should now be had to the embodiments shown in the accompanying drawings and described below. In the drawings:

FIG. 11 shows a front view of adjacently coupled drive links of the belt screen assembly of FIG. 5;

FIG. 12 shows close-up front view of adjacently coupled drive links and associated lifters and wiper blade of the belt screen assembly of FIG. 5;

FIG. 13 shows a partial section view of adjacently coupled drive links of the belt screen assembly of FIG. 5;

FIG. 20 shows a plain view of a screen panel of the belt screen assembly of FIG. 5;

FIG. 21 shows a close-up view of screen panel perforations of the screen panel of FIG. 20;

FIG. 22 shows a perspective view of a lifter of the belt screen assembly of FIG. 5;

DETAILED DESCRIPTION

Figure 1:
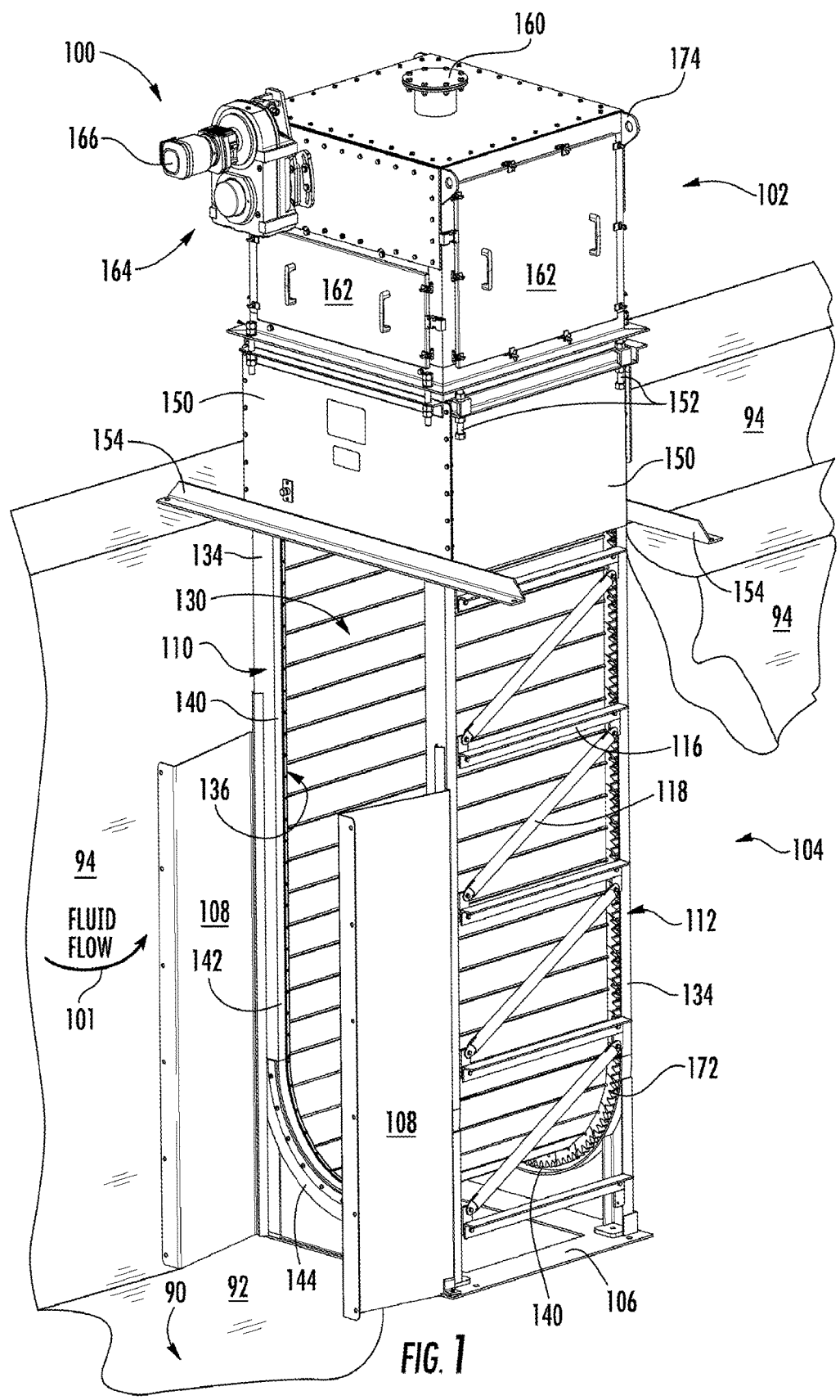
FIG. 1 shows a perspective view of a continuous belt screen system, in accordance with one embodiment of the invention.

Embodiments of the present invention now may be described more fully hereinafter with reference to the accompanying drawings, in which some, but not all, embodiments are shown. Indeed, the invention may be embodied in many different forms and should not be construed as limited to the embodiments set forth herein; rather, these embodiments are provided so that this disclosure may satisfy applicable legal requirements. Other embodiments having different structures and operation do not depart from the scope of the present disclosure. Like numbers refer to like elements throughout.

Certain terminology is used herein for convenience only and is not to be taken as a limitation on the embodiments described. For example, words such as "top", "bottom", "upper," "lower," "left," "right," "horizontal," "vertical," "side," "upward," and "downward" merely describe the configuration shown in the figures or the orientation of a part in the installed position. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

It will be understood that, where possible, any of the advantages, features, functions, devices, and/or operational aspects of any of the embodiments described and/or contemplated herein may be included in any of the other embodiments described or contemplated herein. In addition, where possible, any terms expressed in the singular form herein are meant to also include the plural form and vice versa, unless explicitly stated otherwise. Accordingly, the terms "a" and "an" shall mean "one or more."

As used herein, the term "fluid" may refer to any type of liquid, including but not limited to water, wastewater, untreated water, treated water, a homogeneous mixture, a heterogeneous mixture, sludge, sewage, oil, lubricant, or other like liquid that may include some type of solid waste such as debris, sludge, minerals, silt, dirt, sewage, sand, contaminants, foliage, or another like non-liquid substance. These terms may be substituted for each other and used interchangeably throughout.

One continuous belt screen, or travelling band screen, is the Centre-Flo Band Screen, originally from Johnson Screens, Inc. now Bilfinger Water Technologies, Inc. (CENTRE-FLO is trademark of Bilfinger Water Technologies, Inc.). The Centre-Flo's modular design integrates screening, conveying, and dewatering in a single and easily installed unit. The influent enters the in-line, in channel, semi-submerged screen undergoing a 90 degree change in direction as it flows through the continuously moving screen belt for further processing. A wash sparge system cleans the face of the screen being presented to the influent stream. Recycled effluent, if suitable, may be used as sparge water, potentially resulting in savings in operation costs. The solids captured by the screen are transported with the aid of lifters and dropped in the discharge flume. Water or recycled effluent is used to transfer the screenings from the flume for further processing as may be provided by, for example, a screw press compactor, where they are drained and compacted prior to discharge. Recycled flume water further washes the screened solids off the organic matter, which may be returned back to the channel via downstream screw press equipment. This may improve organic/non-organic solid separation and may eliminate the need for further washing and reduce disposal costs.

Embodiments disclosed herein are directed to a continuous belt screen system used for filtering intake fluid for various municipal and industrial purposes, and may be applicable to the Centre-Flo Band Screen as well as other continuous belt screens and continuous belt systems in general. Fluid may pass through a belt screen assembly, which may retain any debris greater than the size of perforations in screen panels against the inside surface of the screen panels. The belt screen assembly may be rotated via drive links driven by a motor so that retained debris is lifted vertically with lifters coupled to the belt screen assembly. The belt screen assembly continues rotating, which causes the lifters to invert at the top of a belt rotation cycle and dump the retained debris into a flume for efficient extraction. The belt screen assembly then may travel through a cleaning system to remove remaining debris from the inside surface of the screen so that cleanliness of the screen panels is maintained in the path of the flowing fluid.

A channel 90 formed by a floor 92 and upstanding side walls 94 may receive a continuous belt screen system 100, as shown in FIG. 1 with a portion of a side wall 94 removed to allow the system 100 to be seen. The continuous belt screen system 100, thereby disposed in the channel 90, may be mounted to the floor 92 and side walls 94, and the channel 90 may direct fluid to it. The continuous belt screen system 100 may be retrofitted to an existing channel 90 or a disposed in a newly constructed channel 90, and may be configured to accommodate various channel dimensions (e.g., widths and depths) and hydraulic requirements. Fluid flow 101 may be from the channel 90 into the interior of the continuous belt screen system 100 for screening by passing through the screen in an inside-of-the-screen to outside-of-the-screen direction, and out the back of the assembly.

An embodiment of a support structure for the system 100 may include a top assembly 102 mounted to and above a bottom assembly 104. The bottom assembly 104 may include a base 106, flow diverters 108, a front frame assembly 110, a back frame assembly 112, horizontal cross braces 116, angled cross braces 118, and enclosure portions 120. The top assembly 102 and bottom assembly 104 are configured for positioning and allowing operation of a continuous belt screen assembly 130. Certain features of the screen assembly 130 are omitted from FIGS. 1-5 for clarity.

In some embodiments, the base 106 may be mounted to the channel floor 92. The base 106 shown in FIGS. 1-5 may include a substantially rectangular planar surface, such as a frame (FIGS. 1-4) or a plate (FIG. 5), configured to be mounted the floor 92 of the channel 90. Dimensions of the bottom assembly 104 may vary as appropriate in accordance with dimensions of the channel 90. Two flow diverters 108 may each be mounted to the opposing vertical surfaces of the side walls 94, thus directing the flow 130 of fluid into the interior of the continuous belt screen system 100. The base 106 and flow diverters 108 may make up a channel insert guide plate assembly, which may include guide features to receive and align the remainder of the system 100 to rest on the base 106 and slidably engage the flow diverters 108 without being attached. In one embodiment, the only features attached to the floor 92 and side walls 94 of the channel 90 are the base 106 and flow diverters 108, making the rest of the system 100 fully removable from the channel 90 and/or the bottom assembly 104 without the need for personnel entry into the channel 90, eliminating some potential confined spaced issues.

Components to be fastened typically include one or more holes that are configured to receive one or more fasteners, which are not shown in the figures (e.g., bolts, screws, pins, posts, wires, rivets, or the like). Materials such as gaskets, adhesives, sealants, caulks, concrete, cement, epoxies, welds, or hardening agents may also be used for sealing and coupling of features as desired based on the application at various locations throughout the continuous belt screen system 100.

Extending upwardly and preferably substantially vertically from the horizontal planar surface of the base 106 are a front frame assembly 110 and a back frame assembly 112 as shown in FIGS. 1-5. The front frame assembly 110 faces upstream (toward oncoming flow 101) in the channel 90, while the back frame assembly 112 is on the opposite or downstream side. The front frame assembly 110 and the back frame assembly 112 each include two spaced vertical members 134 (e.g., channels, beams, or other rigid lengths) configured to support and provide structure to the continuous belt screen system 100. The front frame assembly 110 defines an elongated opening 136 that is the inlet to the screen assembly 130, while the back frame assembly 112 includes a wall 138 that closes off flow through the back side of the screen assembly 130.

The front base frame assembly 110 and the back base frame assembly 112 each include at the bottom rounded portions, for example, semi-circular, fitted with tracks 140 as depicted in FIGS. 1, 2, and 4-6. The tracks 140 serve as a turning guidance surface configured to receive a screen assembly 130 and allow for its rotation. The tracks 140 include surface hardened high wear-resistant guide bars to precisely control the vertical and horizontal positioning of the screen assembly 130. The tracks 140 are positioned on inside surfaces of the front frame assembly 110 and the back frame assembly 112 and may run vertically along each of the vertical members of the front and back frame assemblies 110, 112 and down to each of the bottom of the rounded portions of the front and back frame assemblies 110, 112. Each track 140 may be covered by an integral belt sealing 142, which is a continuous lip seal that protects the rotating screen assembly 130 from debris buildup along the tracks 140. The shape formed by the track 140 in the back frame assembly 112 may separately resemble a vertically extended "U" shape, while in the top frame assembly 110 the track 140 may resemble a shorter "U" shape.

The height and width of the front frame assembly 110 and the back frame assembly 112 may vary based on dimensions of the channel 90. The front frame assembly 110 and the back frame assembly 112 may be coupled with the plurality of horizontal cross braces 116 and angled cross braces 118, which may be vertically spaced and each fastened at each end to the vertical members 134, as shown most clearly in FIGS. 1 and 3.

Also as illustrated in FIGS. 1, 2, and 4-6, the front frame assembly 110 and the back frame assembly 112 may also each include a lower wear ring 144, which is a replaceable insert that is inserted into one or more areas on the front and back frame assemblies 110, 112 that possess a high potential for wear. A lower wear ring 144 may be coupled to an outside surface of the rounded lower portions of each of the front frame assembly 110 and the back frame assembly 112. In some embodiments the lower wear ring 144 may be removed and replaced with the belt screen system 100 in its installed position; the system 100 need not be removed from the channel 90.

In some embodiments, enclosure portions 150 that may be sheet or other thin, planar material may be mounted to the outer surfaces of the front frame assembly 110 and the back frame assembly 112. The housing portions 150, shown in FIGS. 1-5, may extend downward from the top of the front and back frame assemblies 110, 112 and enclose the upper portions of the continuous belt screen system 100. Shown in FIG. 5, enclosure portions 150 may further include a belt tensioner 152 that includes four prominent accessible lockable jacking screw couplings, one screw on each corner of the tops of the front and back frame assemblies 110, 112, that interface with the top assembly 102 and enable vertical adjustment of the top assembly 102 in relation to the bottom assembly 104. Rotating the screw couplings of the belt tension function 152 raises and lowers the top assembly 102, increasing or decreasing the length of the tracks 110 on which the belt screen assemble 112 travels. In this regard, the tension of the belt screen assembly 130 may be increased or decreased with ease.

Two mounting members 154, shown as angles in this embodiment, may be mounted to the top assembly 102 and/or the top of each of the front frame assembly 110 and the back frame assembly 112 as seen in FIGS. 1-4. One mounting member 154 may be positioned on the side of the upstream and inlet side of the continuous belt screen system 100, while the second mounting member 154 may be positioned on the downstream and back of the continuous belt screen system 100. The mounting members 154 span the channel 90, may be mounted to the top surface of the side walls 94, and may ensure that the continuous belt screen system 100 maintains a proper substantially vertical alignment and remains securely coupled within the channel 90 or any surrounding infrastructural support system.

The top assembly 102 may serve as a housing with four sides and a top designed to enclose the top of the belt screen assembly 130 and maximize leak-proofness during operation of the continuous belt screen system 100. The top assembly 102 is configured to receive the belt screen assembly 130 through an open bottom.

Figure 2:
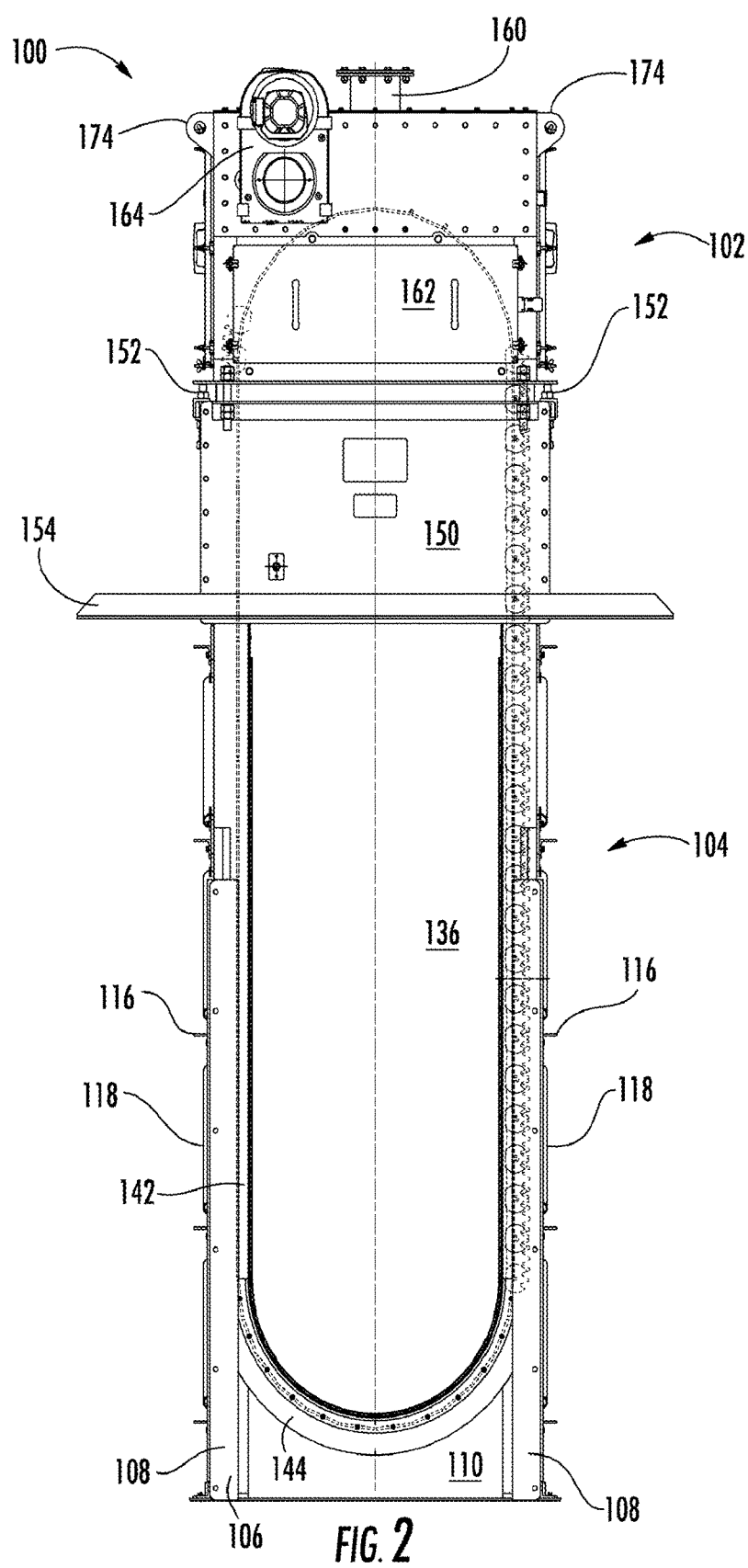
FIG. 2 shows a front inlet view of the continuous belt screen system of FIG. 1.
Figure 5:
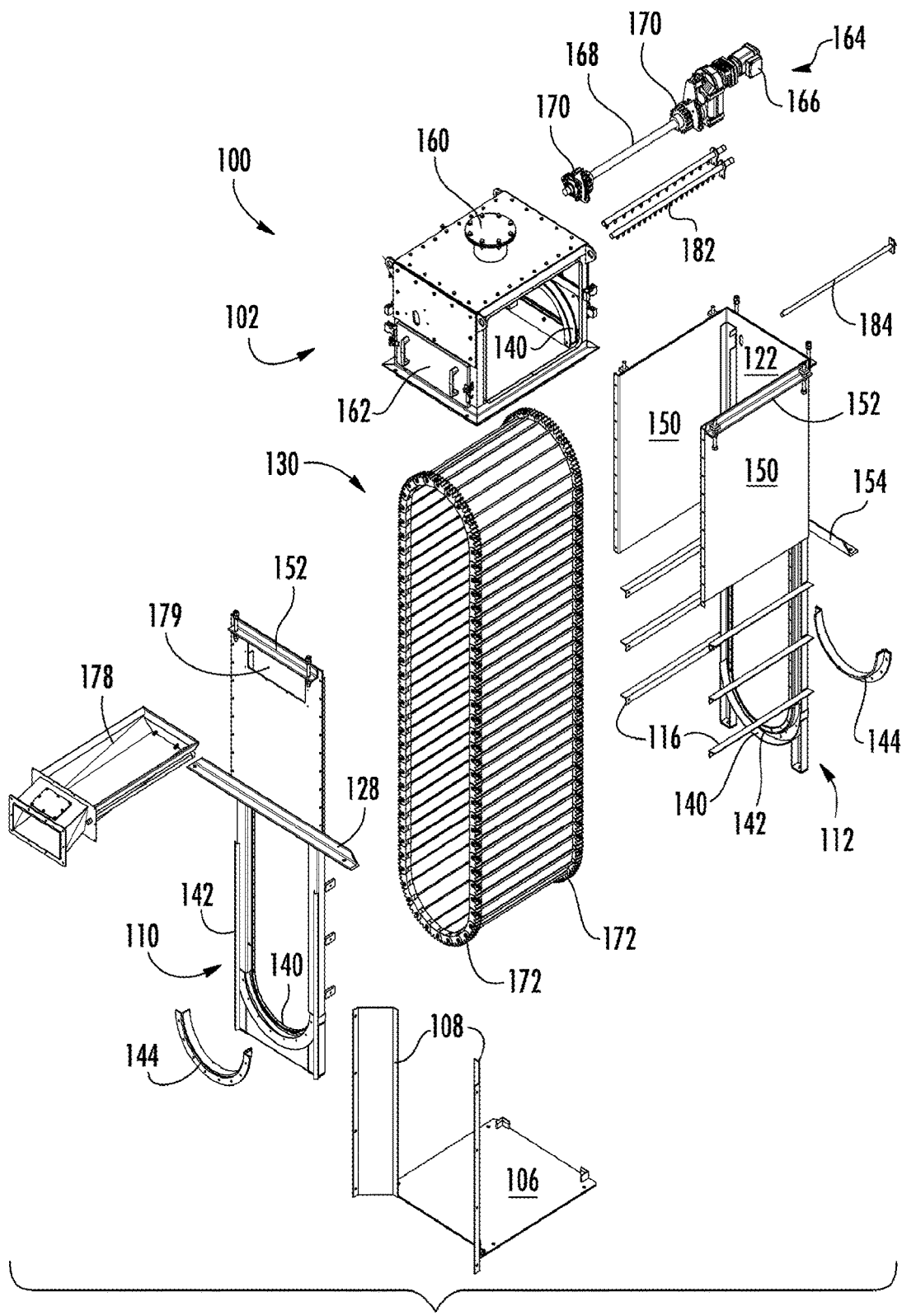
FIG. 5 shows an exploded view of the continuous belt screen system of FIG. 1.
Figure 7:
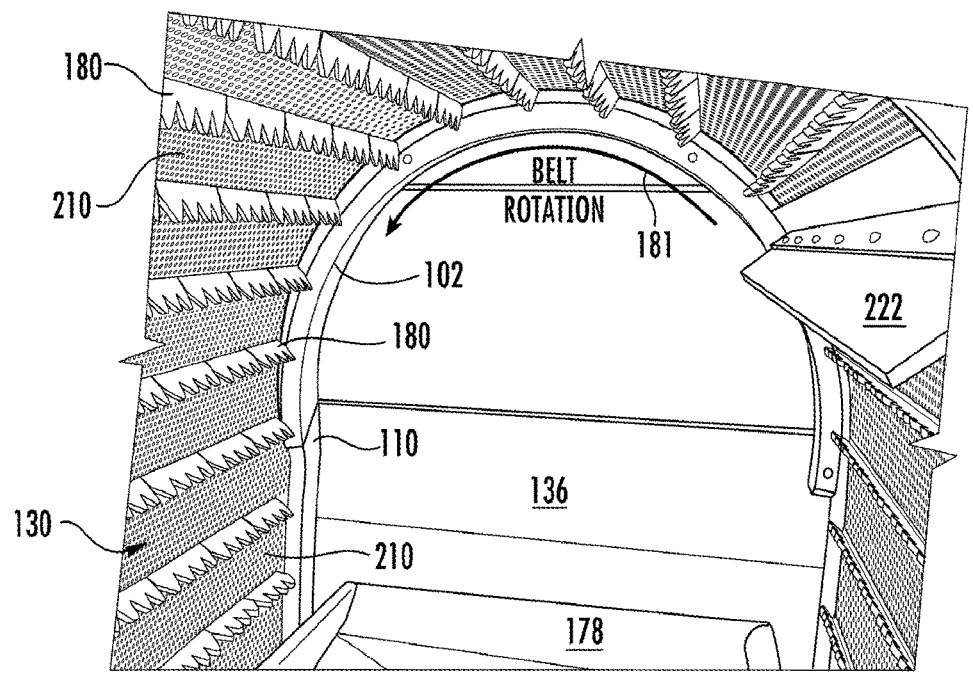
FIG. 7 shows upper inside surfaces of the belt screen assembly of FIG. 1.

The belt screen assembly 130 operatively couples to the top assembly 102 via semi-circular tracks 140 included in the inside surface of the top assembly 126. The tracks 140 in the top assembly are configured to receive the belt screen assembly 130 as seen in FIGS. 2, 5, and 7, and to be in substantial alignment with the tracks 140 of the bottom assembly 104. The tracks 140 included in the top assembly 102 are typically positioned with one track 140 on the front side of the top assembly 102 (e.g., the upstream side with the inlet for flow into the bottom assembly 104), while the second track 140 is positioned on the back side of the top assembly 102 (e.g., the opposite, downstream side). Each track 140 of the top assembly 102 may also include integral belt sealing (not shown) and may substantially resemble an upside-down "U" shape. Alignment of the tracks 140 in the top assembly 102 with the tracks 140 in the front and back frame assemblies 110, 112 permit the belt screen assembly 130 to continuously rotate along the tracks 140 in an extended oval-shaped path.

The top assembly 102 further includes a plurality of apertures (e.g., doors, slots, holes, cutouts, vents, or the like shown in FIGS. 1-5) that enable various elements to pass through or be housed within the interior of the top frame assembly 102. For example, the top surface of the top assembly 102 includes a flanged fume extraction outlet 160 which serves as a vent configured to direct any fumes generated during operation of the continuous belt screen system 100 outside of the enclosed top assembly 102. The top assembly 102 may also include one or more quick release (not bolted flange type) access panels 162. The access panels 162 are designed to maximize panel size and access for inspection and maintenance requirements and maybe provided on all four sides of the top assembly 102.

Shown in FIGS. 1-5, the top assembly 102 also includes an aperture configured to receive a drive assembly 164, which includes a motor 166 configured to drive rotation of the belt screen assembly 130. The drive assembly 164 supports adjustable pivot shaft positioning and includes a drive shaft 168 that extends into the interior of the top assembly 102 to operatively couple with and rotate the belt screen assembly 130 during operation. The motor 166 may be variable in speed and multi-directional (e.g., can operate in forward or reverse at multiple speeds). The drive assembly 164 also includes two drive gears 170—one to operatively couple with and engage a front loop of the belt screen assembly 130 and one to operatively couple with and engage a back loop of the belt screen assembly 130—that are operatively coupled to and driven by the drive shaft 168. Each of the drive gears 170 preferably has an involute profile for extremely low friction and to engage drive links 172 of the belt screen assembly 130. The motor turns the drive shaft 168, which turns the drive gears 170, which in turn engage drive links 172 of the belt screen assembly 130 and therefore causes the belt screen assembly 130 to rotate.

Additionally, the top assembly 102 may include fully telescoping internal skirting (not pictured) that extends from the top assembly 102 and into a lower portion of the continuous belt screen system 100 defined by the front and back frame assemblies 110, 112, as well as comprehensive gasketing, to seal all apertures, hatches, and openings within the top assembly 102.

The top assembly 102 further may include lifting lugs 174 on each of its four top corners that enable the top assembly 102 (and thus the continuous belt screen system 100 when assembled) to be lifted safely by a crane or other lifting apparatus during installation or removal.

Figure 3:
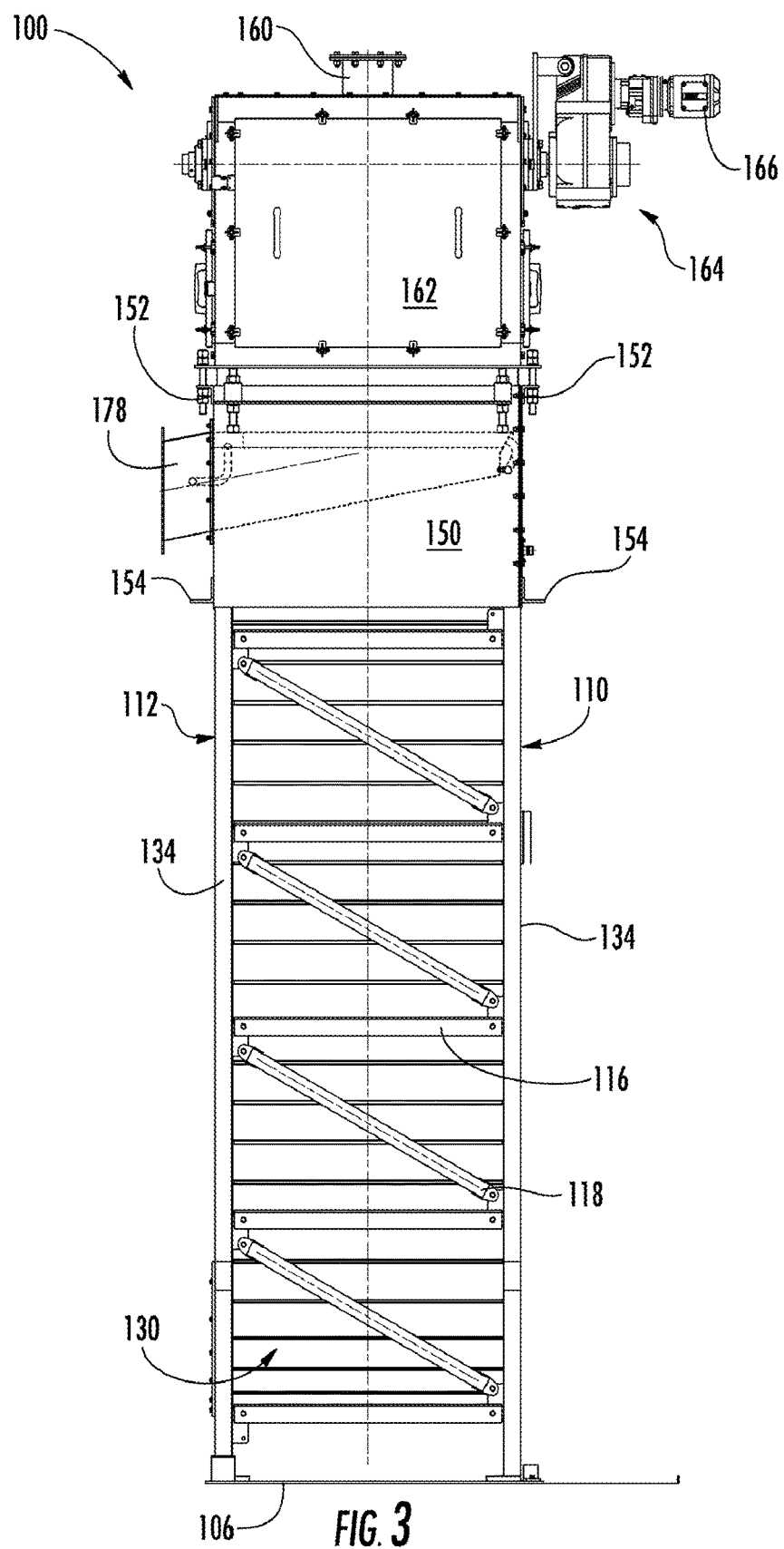
FIG. 3 shows a side view of the continuous belt screen system of FIG. 1.
Figure 4:
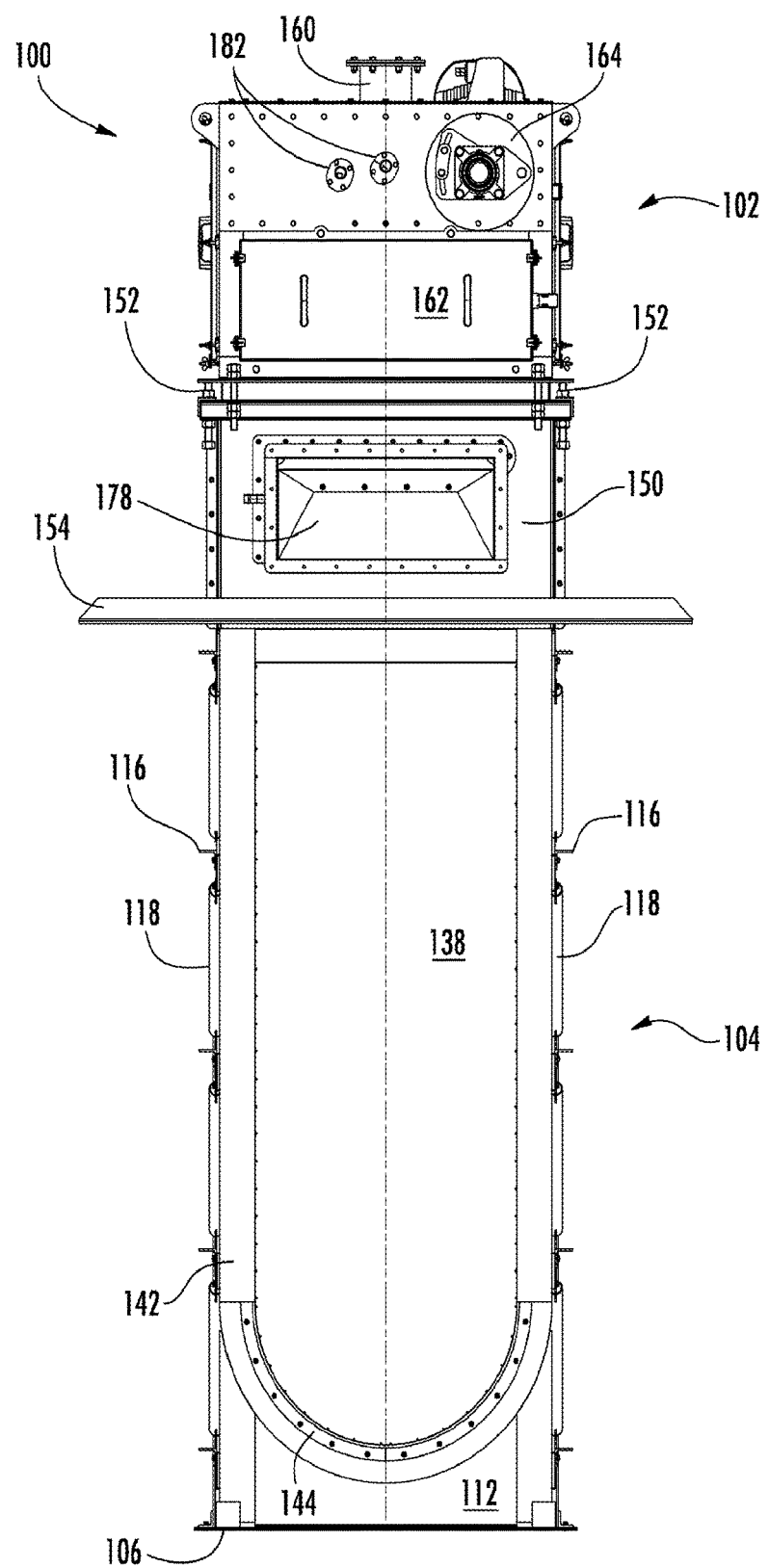
FIG. 4 shows a back view of the continuous belt screen system of FIG. 1.
Figure 6:
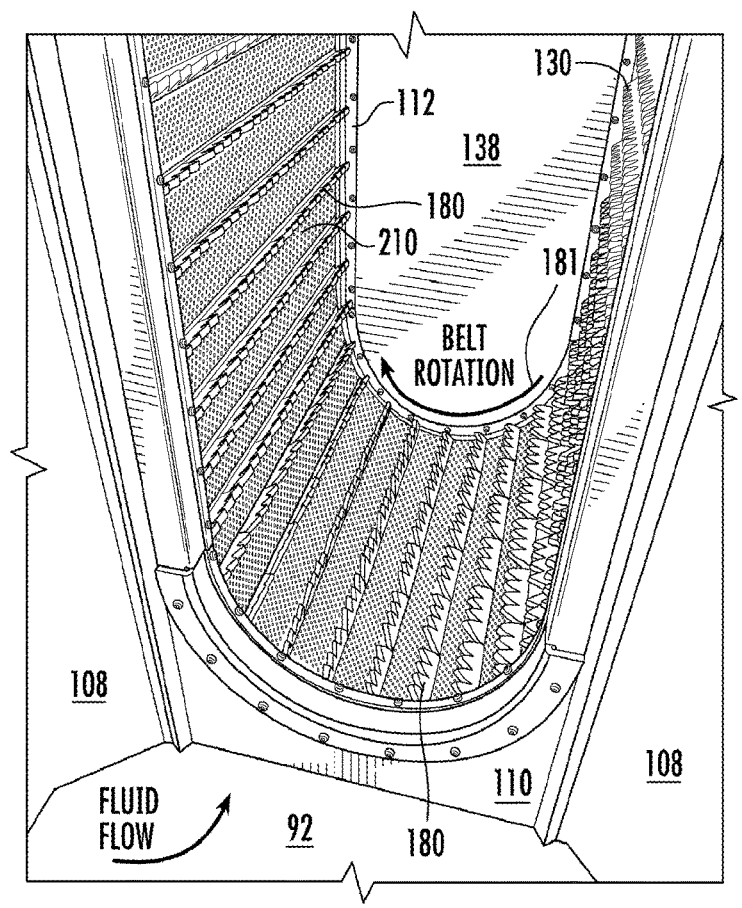
FIG. 6 shows lower inside surfaces of a belt screen assembly of the continuous belt screen system of FIG. 1.

A flume 178 may pass through an aperture 179 included in the enclosure portion 150 of the outside surface of the front base frame assembly 106 as depicted in FIGS. 3-5. The flume 178 may be a sloped trough extending within the top assembly 102 and is configured to catch solids as they are lifted and dumped by lifters 180 at the top of a belt rotation cycle of the belt screen assembly 130 as seen in FIG. 6. The flume 178 may be sloped to allow caught solids to flow downwards and exit the continuous belt screen system 100 in a safe and controlled manner. The caught solids may exit the flume and be removed from the continuous belt screen system 100 via a conveyor belt or another method of secure solid waste removal. The design of the flume 178 may be optimized to maximize the capture of solids exiting the belt screen assembly 130 and preferably includes a maximum cross-sectional area and a steep angle (e.g., slope) to ensure efficient removal of solids, even during extreme flows (e.g., high volume) of solids. Flush nozzle pipework (not pictured) is fully concealed behind the belt screen assembly's solids drop off trajectory and is configured to spray the flume 178 with water or another liquid to prevent formation of a solids collection zone catch point in the flume 178. Therefore, the removal of solids from the continuous belt screen system 100 via the flume 178 may be uninhibited by buildup up solids on or in the flume 178 and promote cleanliness and efficiency during solids removal processes.

FIGS. 6 and 7 show the plurality of lifters 180 mounted across the screen assembly 130. The lifters 180 are not shown in FIGS. 1-5 for clarity. In FIG. 6, the view is toward the back frame assembly 112 and the wall 138, with the belt rotation 181 being clockwise, while in FIG. 7 the view is forward or upstream from within the belt screen assembly 130, looking out of the inlet opening 136, with the belt rotation 181 being counterclockwise. The lifters 180 extend inward to catch, lift, and dispose of debris; while FIG. 6 shows the top of the cycle in the top assembly 102, FIG. 7 shows the bottom of the cycle in the bottom assembly 104.

The back frame assembly 112 may also include apertures configured to receive one or more belt cleaning sparges 182 as depicted in FIG. 5. The belt cleaning sparges 182 may include spray nozzles selected for efficient cleaning across the full width of the belt screen assembly 130. The belt cleaning sparges 182 may be adjusted for on and off cycles to suit site conditions. A supplementary sparge 184 may be provided to pre-clean surfaces of drive links 172 (as well as other elements of the belt screen assembly 130) prior to engagement with or being received by the tracks 140 in the top assembly 102 for maximizing cleanliness and smooth functionality. The belt cleaning sparges 182 may be used during a designated cleaning cycle, which is one of the operation modes of the continuous belt screen system 100.

The top assembly 102 and base assembly 104, including their fasteners, may be fabricated from, for example, stainless steel, but materials may be selected by one of ordinary skill in the art as appropriate for the application, with criteria including but not limited to adequate rigidity, strength, and corrosion resistance to the fluid and its contents.

Figure 8:
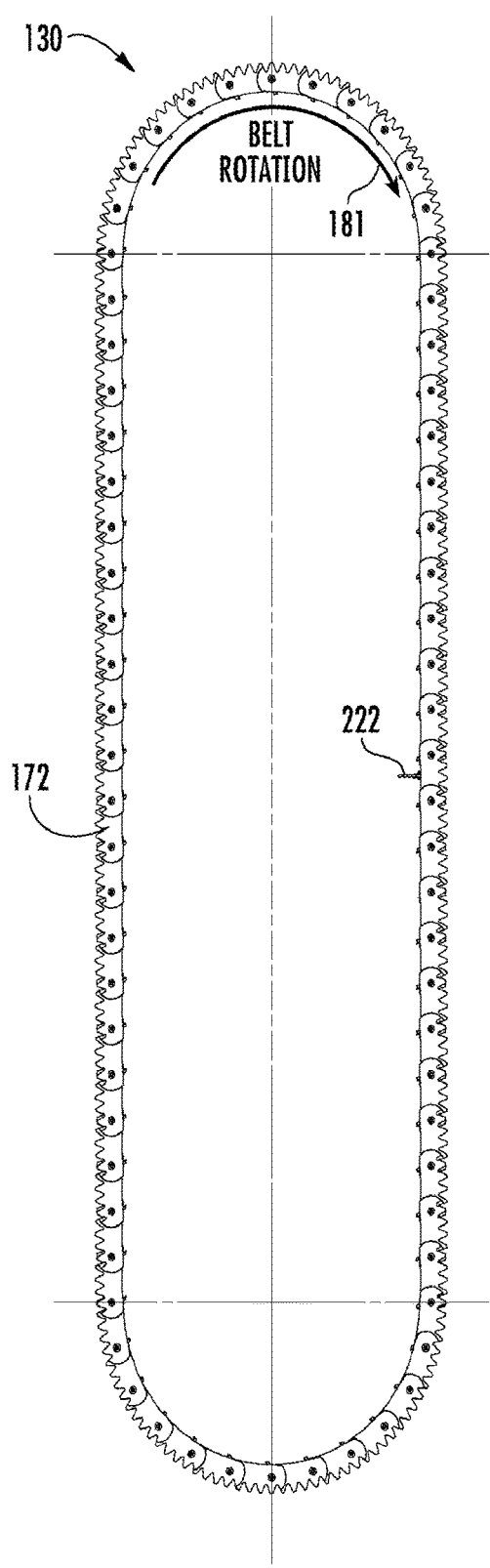
FIG. 8 shows a front view of the belt screen assembly of FIG. 5.
Figure 9:
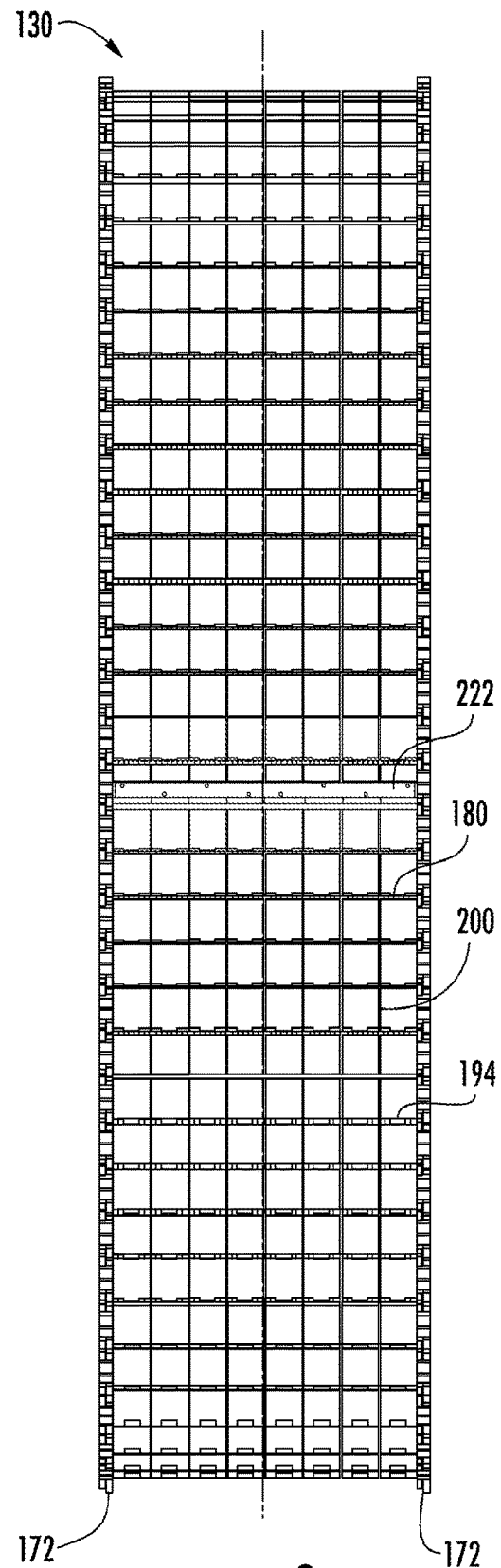
FIG. 9 shows a side view of the belt screen assembly of FIG. 5.

The belt screen assembly 130 is configured to engage, be received by, and rotate along the tracks 140 located within the inside surfaces of the front and back frame assemblies 110, 112 and the top assembly 102. The belt screen assembly 130 includes a plurality of drive links 172 coupled together to form two parallel endless loops as shown in FIGS. 8 and 9, and shown in part in FIG. 10.

Figure 10:
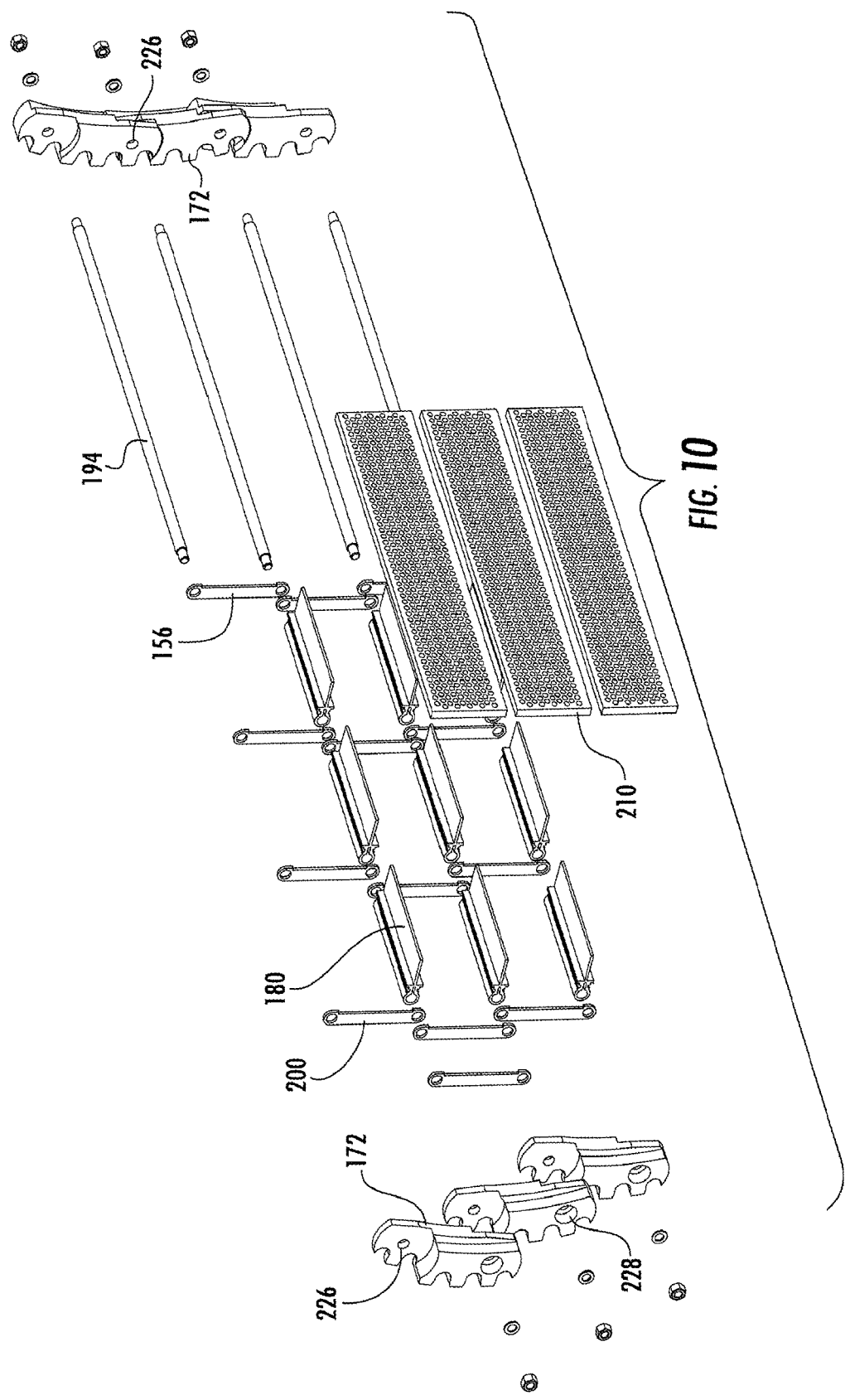
FIG. 10 shows an exploded view of the portion of the belt screen assembly of FIG. 5.
Figure 14:
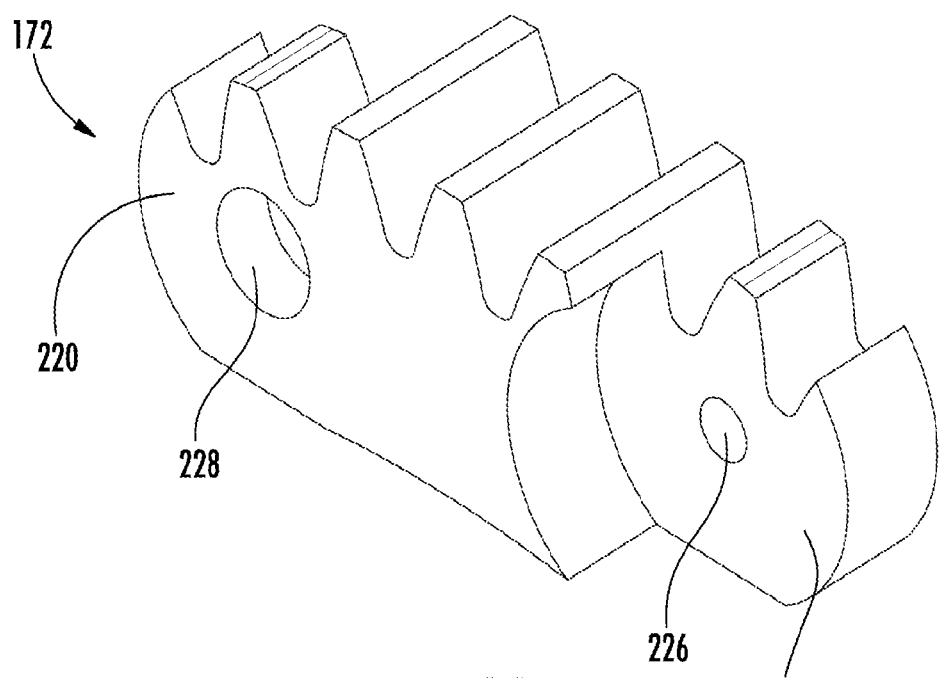
FIG. 14 shows a perspective view of one drive link of the belt screen assembly of FIG. 5.
Figure 15:
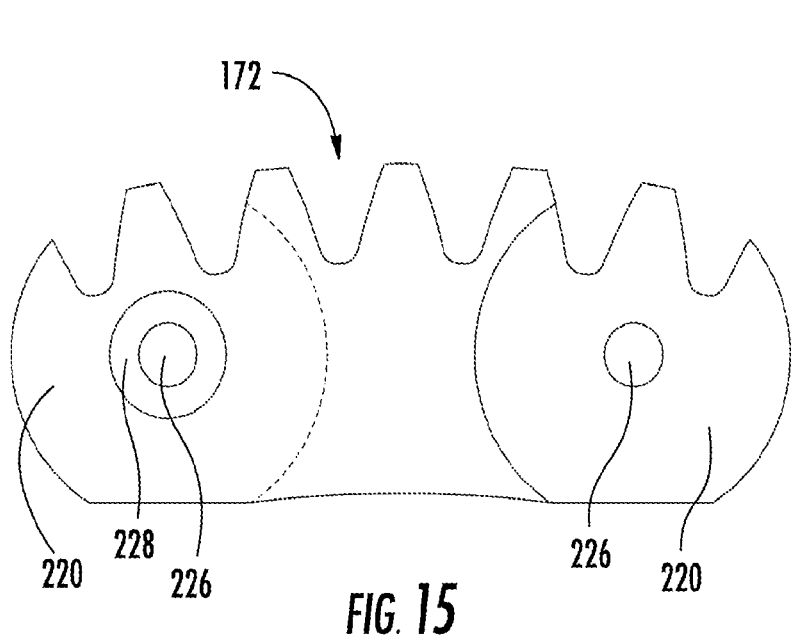
FIG. 15 shows a front view of the drive link of FIG. 13.

FIG. 10 shows that a plurality of belt links 200 is installed along the length of a pivot shaft 194 (e.g., a cylindrical rod with two ends configured to receive fasteners, such as nuts, locks, pins, or the like) to ensure proper spacing of adjacent drive links 172. Typically fabricated from stainless steel or another rigid material, each belt link 200 may include a body the defines two apertures, one at each end of each belt link 172 that are each configured to receive a pivot shaft 194. Two drive links 172 are connected to each other by inserting and securing a pivot shaft 194 in the apertures of the adjacent drive links 172. Belt links 200 enable adjacent drive links 172 to pivot in relation to adjacent drive links 172 around the pivot shaft 194. The belt links 172 may also provide support for perforated screen panels 210. Each pivot shaft 194 appropriately spaces two drive links 200, one at each end of the pivot shaft 194, so that the two parallel loops of drive links 172 align with the two drive gears 170 as well as the tracks 140 of the top assembly 102 and the bottom assembly 104. The length of each pivot shaft 194 typically defines the width of the belt screen assembly 130.

The drive links 172 may be fabricated from a high density plastic or another rigid material and have offset connection portions 220 at each end (FIGS. 14-18) to provide substantially flush opposite surfaces parallel to the plane of rotation of the belt screen assembly 130 when connecting adjacent drive links 172 (FIGS. 11-13 and FIG. 19). Accordingly, the offset distance and the width of each drive link connection portion 220 may be, for example, one half the width of the adjacent drive link 172 so that when adjacent drive links 172 are coupled together, the outside surfaces of the two adjacent drive links 172 are flush with one another, thus enabling smooth rotation of the belt screen assembly 130 along the tracks 140.

As illustrated in FIG. 12, the belt screen assembly 130 also includes a wiper blade 222. The wiper blade 222 may be mounted to a support that is also mounted to the belt screen assembly 130. The wiper blade 222 may be a low density plastic wiper fitted to the inside surface of the belt screen assembly 130 and configured to extend inward. The purpose of the wiper blade 222 is to sweep the leading and training edges of the flume 178 to maintain flume edge cleanliness. So, when the belt screen assembly 130 is rotated to the top of the belt rotation cycle, the wiper blade 222, which is coupled to the belt screen assembly 130, wipes the edges of the flume 178 where solids may build up over time. Thus, any built-up solids on the edges of the flume 178 are wiped either into the flume 178 for removal or back into the fluid for later removal.

An involute profile may be provided on the surface of each drive link 172 that engages a drive gear 170 of the drive assembly 174 as shown for the drive links 172 of FIGS. 8-19. The involute profile of each drive link 172 may include a number of substantially triangular peaks and valleys, or teeth 224. The involute profile may be defined by a curve across the ends of the teeth 224 which then transitions to the curves, which may be substantially circular, for example, at each end of the drive link 172. Teeth of the drive gears 170 engage teeth 224 of the belt links 172 to cause rotation of the belt screen assembly 130.

Figure 16:
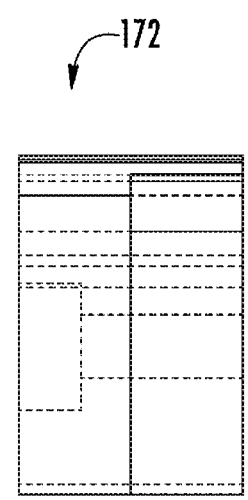
FIG. 16 shows a side view of the drive link of FIG. 13.
Figure 17:
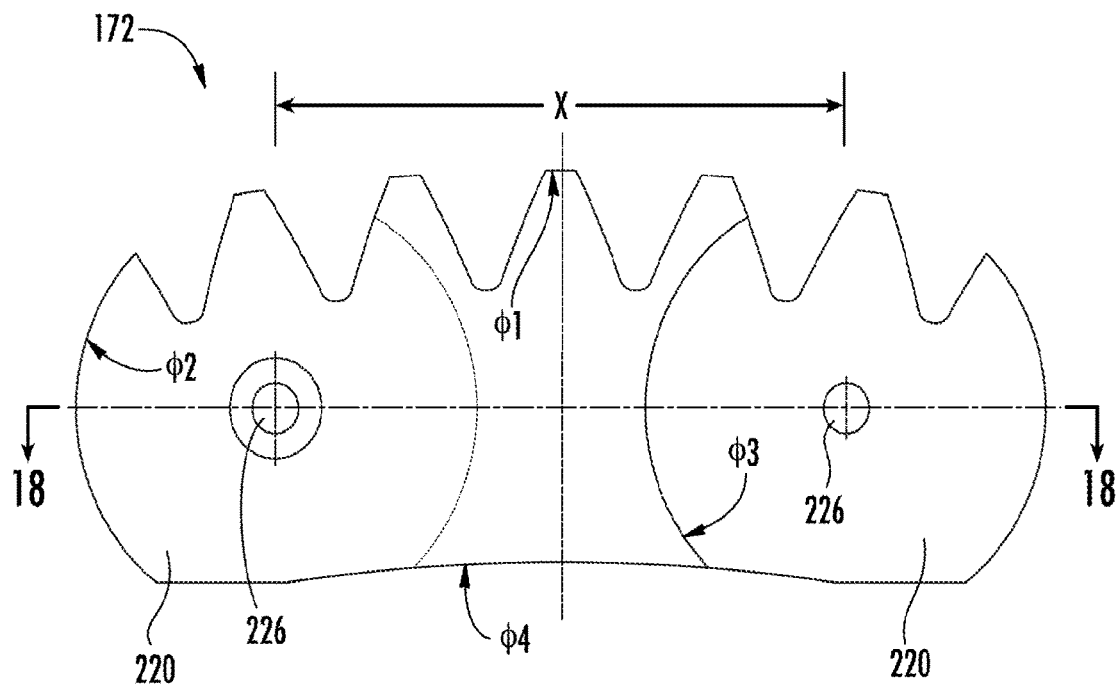
FIG. 17 shows another front view of the drive link of FIG. 13.
Figure 18:
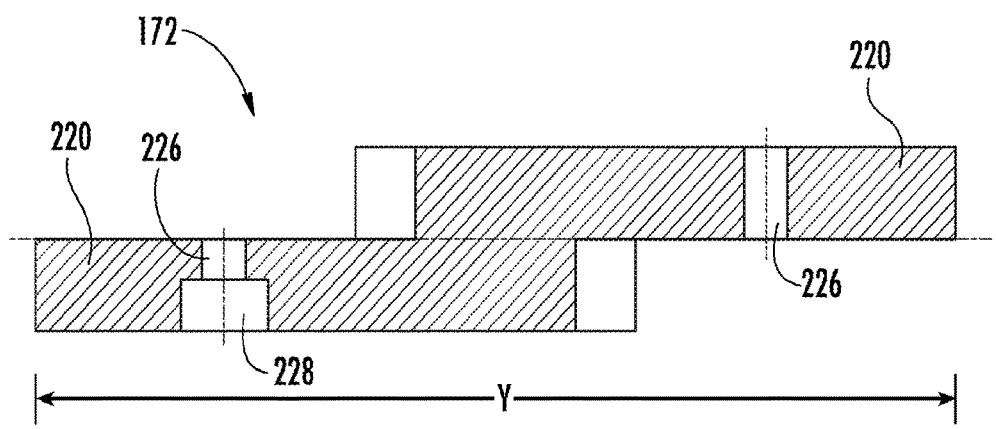
FIG. 18 shows a section view of the drive link of FIG. 13 taken along line 18-18 of FIG. 17.

As shown in FIGS. 14-18, each drive link 172 includes two apertures 226 through which the pivot shaft 194 may configured to pass to connect adjacent drive links 172 together, and about which the drive links 172 may pivot (FIG. 10). Fasteners (e.g., nyloc nuts, spacer washers, or the like) are fully recessed within an area 228 associated with each drive link aperture 226 as illustrated in FIGS. 16-18 to eliminate debris catch points from otherwise exposed coupling components.

FIGS. 17 and 18 provide some dimensional indications for one embodiment of the drive links 172. The overall length Y in FIG. 18 may be on the order of 250-300 mm, and in one embodiment is 273 mm, while the distance X between apertures 226 may be on the order of 150-200 mm, and in one embodiment is approximately 160 mm. The diameter $\Phi 1$ of the involute toothed surface may be on the order of 1300-1400 mm, and on one embodiment is approximately 1,350 mm. The diameter $\Phi 2$ of the outer curve the connection portions 220 of each link 172 may be on the order of 100-130 mm, and in one embodiment is approximately 112 mm, and the diameter $\Phi 3$ of the inner curve may be also be on the order of 100-130 mm, and in one embodiment is approximately 113 mm. The diameter $\Phi 4$ of the surface opposite the toothed surface may be on the order of 1,100-1,200 mm, and in one embodiment is approximately 1,140 mm.

It should be noted that the lifters 180 are omitted from FIGS. 8 and 9 for clarity, and are shown in one embodiment in FIGS. 10 and 19 as rectangular, but other shapes may be provided as discussed below.

Figure 19:
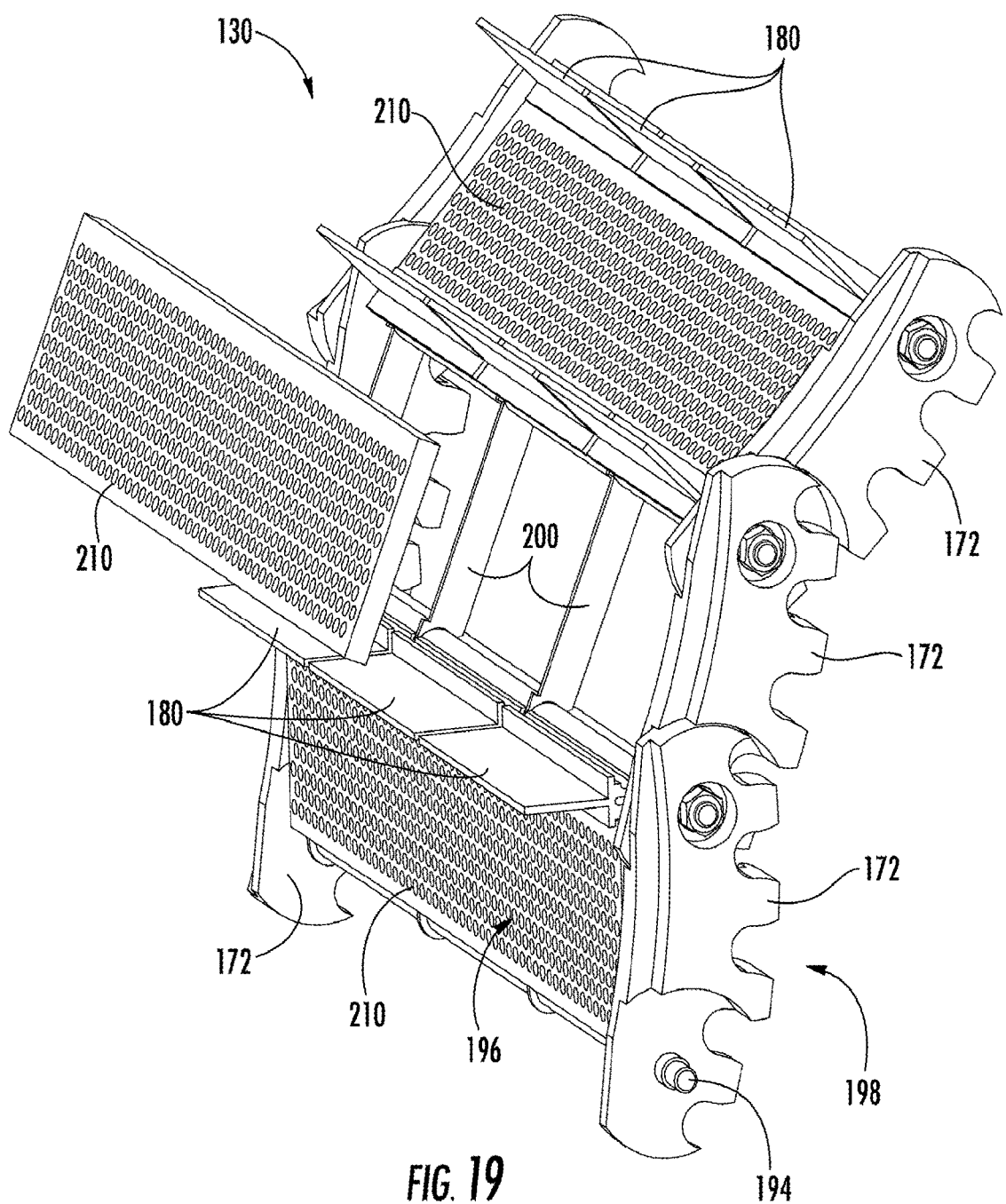
FIG. 19 shows a perspective view of a portion of the belt screen assembly of FIG. 5.
Figure 23:
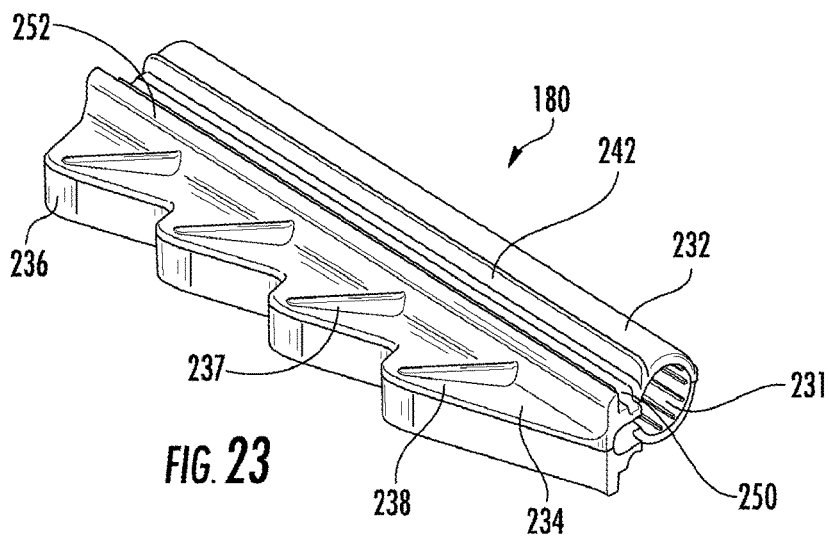
FIG. 23 shows a front perspective view of the lifter of FIG. 22.
Figure 24:
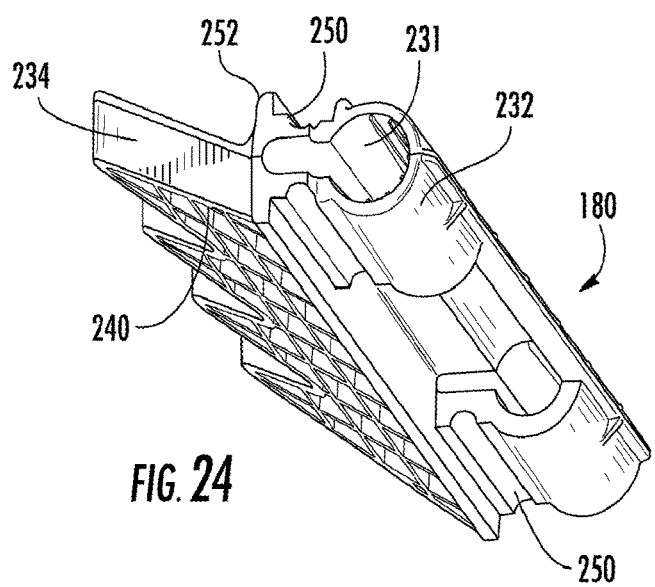
FIG. 24 shows a rear perspective view of the lifter of FIG. 22.
Figure 25:
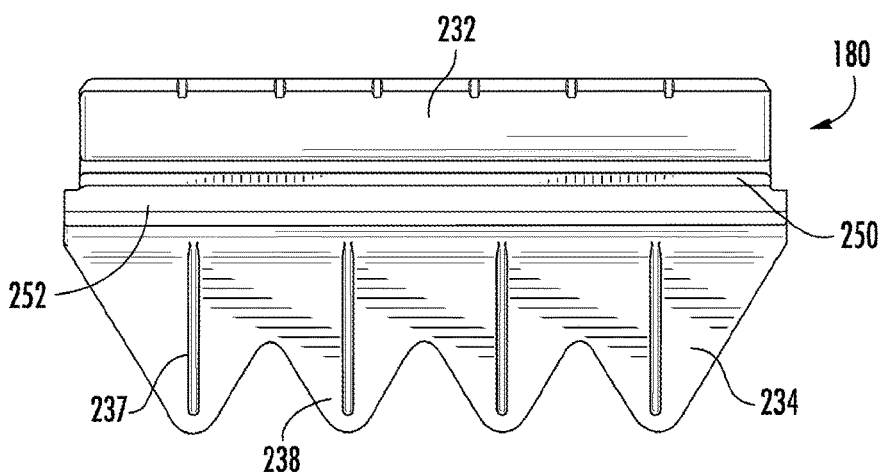
FIG. 25 shows a top view of the lifter of FIG. 22.
Figure 26:
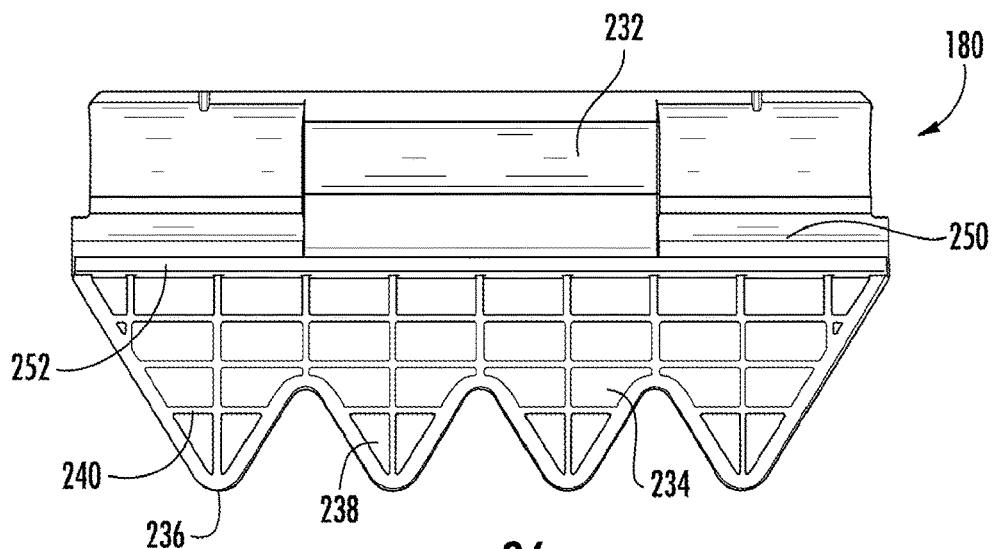
FIG. 26 shows a bottom view of the lifter of FIG. 22.
Figure 27:
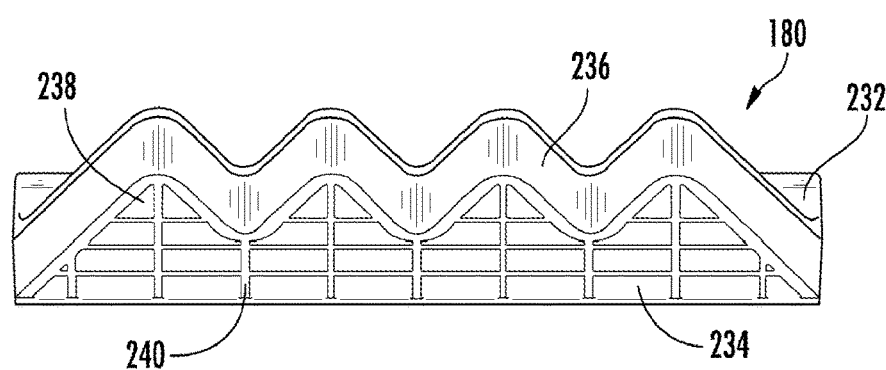
FIG. 27 shows a front view of the lifter of FIG. 22.
Figure 28:
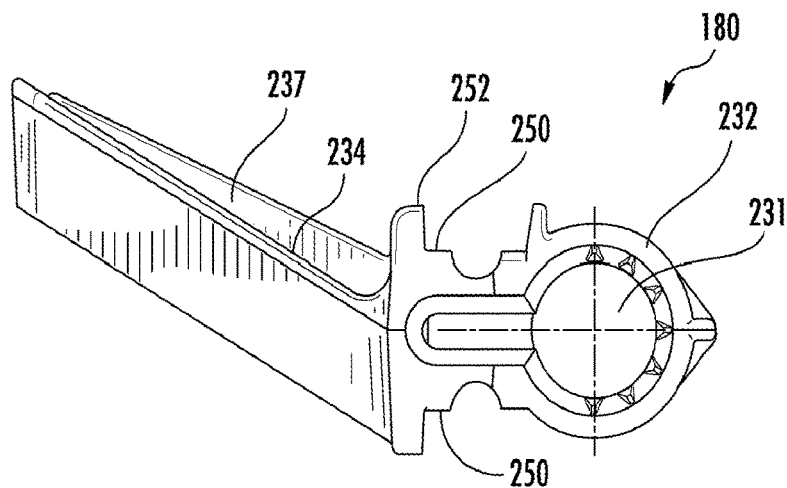
FIG. 28 shows a side view of the lifter of FIG. 22.

The modularity of the screen assembly is shown in FIG. 19. One result may be that the screen panels 210 may be replaced without disassembling the whole belt screen assembly 130, or removing the belt screen system 100 from its installed position. The lifters 180 are configured to physically trap the screen panels 210 in place in the belt screen assembly 130. When opposing drive links 172 are rotated adequately about the pivot shaft 194 in the direction away from the interior of the belt screen assembly 103, a screen panel 210 may be released, without the removal of a pivot shaft 194. Accordingly, the belt screen assembly 130 need only be loosened to permit this rotation of drive links 172 and replacement of a screen. The tension of the belt screen assembly 130 may be loosened by lowering the top assembly 102 by adjusting the belt tensioner 152 and associated jacking screw couplings (FIG. 1). Pivoting the screen panels 210 in the opposite direction from normal operation, which means pivoting the screen panels outward, away from the interior surface 196 adjacent to the un-filtered liquid and toward the outside surface 198 adjacent to the filtered liquid, releases a screen panel 210 and allows replacement.

Replacement of screen panels 210 may be completed from the deck (spanning the channel 90 from the walls 94 (not shown), out of the channel 90. Alternative screen panels may be provided that are interchangeable with existing screen panels and the system 100 may provide a cost-effective and efficient method of screen panel conversion. Screen panels 210 can be replaced without disassembling the whole belt screen assembly 130 and therefore eliminate extended periods of downtime due to maintenance.

Referring to FIGS. 20 and 21, screen panels 210 may be constructed of, for example, high strength and/or high toughness plastic with optimized and customizable perforated holes 230. Each screen panel 210 is designed to allow for the flow of fluid to pass through the perforated holes 230 while the screen panel 210 catches or retains any solids in the fluid that are too large to pass through the perforated holes 230. The screen panels 210 are designed to be modular as seen in FIGS. 10 and 19, and alternative screen media of any preference may be accommodated. The screen panels 210 may be, in on embodiment, substantially rectangular planar surfaces that extend within a defined space between the two parallel loops of drive links 172 and two adjacent pivot shafts 194. The perforation holes 230 of the screen panels 210 as seen in detail in FIG. 21 are typically equally spaced and equally sized (e.g., between one and six millimeters in diameter) across the screen panel 210 and may be burr-free.

The lifters 180 are shown in detail in FIGS. 22-28. A plurality of lifters 180 is, in one embodiment, installed along the length of the pivot shaft 194. The lifters 180 each define a longitudinal aperture 231, for example, a cylindrical opening along a longitudinal axis, formed by a sleeve 232 that extends along the width of each lifter 180, and a web or paddle portion 234 extending form the sleeve 232 and away from the pivot shaft 194 and screen panels 210. In the embodiment shown, the lifters 180 are discrete, separate elements from the screen panels 210. The pivot shaft 194 may be fed through the sleeve 232, shown in this embodiment to have an open side for part of the sleeve 232 and aperture 231. Each end of the pivot shaft 194 extends past the lifters 180 and the belt links 200 at each end of the belt screen assembly 130 to be received in apertures 226 associated with the drive links 172.

The free end, i.e., free edge of the lifter in this embodiment is contoured. This contoured free end or edge 236 defines four substantially triangular teeth 238, although other numbers of teeth, or no teeth at all, are possible. Such contouring and teeth 238 may provide efficient grabbing and releasing of solid waste. The contouring could take different shapes than triangular, and the shape of the paddle portion 234 could be rectangular with a leading straight edge. Several reinforcement features are provided on the lifters 180. On the top surface there are ribs 237 extending in the direction laterally away from the sleeve 232. The bottom side of the paddle portion 234 may have perpendicular reinforcing ribs 240 for additional strength without needing to provide a solid piece. A longitudinal rib 242 may also be provided for strength adjacent to the sleeve 232.

On the top and bottom of the lifters 180 in between the sleeve 232 and the paddle portion 234 are formed slots 250 for receiving edges of the screen panels 210. When the screen panels 210 are received in adjacent slots 250 of adjacent lifters 180, the screen panels 210 are secured to the belt screen assembly 130 without the use of any fasteners; the walls 252 of the slots 250 trap the screen panels 210 to restrain movement. With manipulation of the drive links 172 the slots 250 may be rotated and a screen panel 210 released without taking apart the belt screen assembly 130.

As the belt screen assembly 130 rotates along the tracks, the lifters 180 are rotated into the fluid and then rise out of the fluid. As the lifters 180 rise out of the fluid, they may catch solids in the fluid and lift them out of the fluid for extraction. The high frequency of the lifters 180 may provide for rapid removal of solids and easier maintenance of screen panel surface cleanliness, thus enabling high flow through the perforations 230 of the screen panels 210.

The shape of the lifters 180 is such that as they travel upward with the rotating belt screen assembly 130, the lifters 180 are substantially perpendicular to the screen panels 210. At the top of a belt rotation cycle, the lifters 180 are inverted, and any caught solids are disposed into the flume 178 by gravity, as well as with the wash from the belt cleaning sparges 182.

The lifters 180 may include a low friction surface combined with a contoured edge, as shown in the embodiment of FIGS. 22-28, that may provide an effective combination for collection of varying solids while simultaneously providing for efficient solids release upon inversion of the lifters 180 at the top of the belt rotation cycle (e.g., when the lifters 180 invert and release solids into the flume 178).

The lifters 180 may in one embodiment be injection molded hard plastic. Alternatively, they may be fabricated from a flexible material so that the lifters 180 flex rather than break when placed under stress. The lifters 180 may be formed from a flexible material configured to deflect as the belt screen assembly 130 travels around curved portions of the pair of tracks 140. The flexible material may have, for example, a Shore A Durometer of between approximately 70 and 90, and more particularly may have a Shore A Durometer of approximately 80. The material may be, in one embodiment, polyuretheane.

Use of relatively inexpensive and short multiple lifters 180 may be advantageous because if a lifter 180 were to break, only the small damaged lifter 180 requires replacing, as opposed to a larger more expensive lifter or even the entire belt screen assembly 130. In addition, some other systems use screen panels that have the lifter molded into them as one part, so if a lifter is broken, replacement of both the lifter and the significantly more expensive screen panel is required.

A very clean internal surface associated with the screen panels 210 and the lifters 180 (which typically extend into the interior of the continuous belt screen system 100) greatly reduces the amount of catch points for solids and debris that will not release at the top of the belt rotation cycle. Further, very high screen open areas are achievable because the arrangement of lifters 180 on the belt screen assembly 130 enables the perforated screen panels 210 to span the entire length and/or width of the belt screen assembly 130. The design of the lifters 180 on the screen belt assembly 130 readily accepts flat perforated screen panels 210. Therefore there is no need to mold the screen panels 210 or remove molding restraint of flow. Without the flow restraint the perforated holes 230 in the screen panels 210 can be placed closer together, allowing more open area through which fluid may flow. The combination of the lifter 180 and drive link 172 components may reduce maintenance issues and may improve the performance of the device over similar configurations.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope of the invention. Therefore, it is to be understood that, within the scope of the appended claims, the invention may be practiced other than as specifically described herein.

What is claimed is:

1. A continuous belt screen assembly for removal of solid waste from fluid in a channel, the assembly comprising:
   a pair of spaced, opposing endless belts, each belt formed from a plurality of drive links;
   a plurality of lifters, each lifter being operably mounted to the pair of belts and configured for lifting of solid waste out of the fluid in the channel; and
   a plurality of screen panels, each screen panel being interposed between a pair of lifters and secured in place by engagement with the lifters,
   wherein each lifter is mounted between the belts by a pivot shaft extending between the endless belts, each of the pivot shafts having two ends, with at least one of the lifters being pivotally mounted to each pivot shaft, each lifter further defining a pair of slots extending parallel to the pivot shafts and on opposite sides of the lifter, such that slots from adjacent lifters open towards each other, and
   wherein at least one of the screen panels is received in the slots of the adjacent lifters to be secured releasably in place between the adjacent lifters and wherein manipulation of the drive links allow the pair of slots to be rotated and the corresponding screen panel to be removed from the pair of endless belts without removing the corresponding pivot shafts from the endless belts.

2. The continuous belt screen assembly of claim 1, wherein the screen panels are secured in place in the slots by being physically blocked by walls of the slots.

3. The continuous belt screen assembly of claim 1, wherein the screen panels may be released from the slots by releasing tension on the endless belt and manipulation of the lifters and screen panels.

4. The continuous belt screen assembly of claim 1, wherein each drive link defines an aperture at each end, and each aperture receives an end of one of the pivot shafts such that one endless belt is positioned at one end of each pivot shaft and the other endless belt is positioned at the other end of each respective pivot shaft.

5. The continuous belt screen assembly of claim 1, wherein each drive link defines a toothed surface configured for engagement with a toothed drive gear to cause rotation of the endless belts, and wherein the ends of the teeth of the toothed surface of the drive link extend to define an involute profile.

6. The continuous belt screen assembly of claim 1, further comprising a plurality of belt links having two ends, wherein each end of each belt link is each mounted to one of the pivot shafts and each belt link is arranged substantially perpendicularly to the pivot shaft to which the respective belt link is mounted.

7. The continuous belt screen assembly of claim 6, wherein each pivot shaft carries a plurality of the lifters in pivotal engagement.

8. The continuous belt screen assembly of claim 7, wherein an end of a belt link is interposed between adjacent lifters on the pivot shaft.

9. The continuous belt screen assembly of claim 1, wherein the lifters comprise a sleeve portion for receiving the pivot shaft and a paddle portion extending from the sleeve portion and terminating at a free end.

10. The continuous belt screen assembly of claim 9, wherein the free end of the paddle portion of the lifter defines a contoured edge opposite the sleeve portion.

11. The continuous belt screen assembly of claim 10, wherein the contoured edge of the paddle portion forms teeth.

12. The continuous belt screen assembly of claim 9, wherein the lifter comprises a flexible material configured to deflect as the belt screen assembly travels around a curved path.

13. The continuous belt screen assembly of claim 12, wherein the flexible material has a Shore A Durometer of approximately 70 to approximately 90.

14. The continuous belt screen assembly of claim 12, wherein the flexible material comprises polyurethane.

15. A continuous belt screen system for removal of solid waste from a fluid in a channel, the system comprising:
a support structure comprising a pair of spaced, opposing tracks;
a continuous belt screen assembly comprising:
a pair of endless belts each received in one of the pair of tracks and each endless belt comprising a plurality of drive links, each drive link having two ends and teeth and defining an aperture at each end;
a plurality of pivot shafts, each pivot shaft including one end engaging one endless belt and another end engaging the other endless belt, the plurality of pivot shafts connecting adjacent drive links to form the endless belt, wherein each aperture receives an end of one of the pivot shafts such that one endless belt is positioned at one end of each pivot shaft and the other endless belt is positioned at the other end of the pivot shafts;
a plurality of lifters, each lifter being pivotally mounted to one of the pivot shafts and configured for lifting solid waste out of the fluid in the channel, wherein each of the lifters defines a contoured free end forming teeth;
a plurality of screen panels, each screen panel being interposed between a pair of adjacent lifters and operably mounted to the endless belts, each lifter defining a pair of slots extending parallel to the pivot shafts with slots from adjacent lifters opening towards each other, with at least one screen panel received in the slots of the adjacent lifters to be secured releasably in place between the adjacent lifters;
a drive assembly comprising and a drive shaft and a gear associated with at least one of the endless belts and rotatably driven by the motor, the gear engaging the teeth of the drive links for rotating the endless belts in the tracks; and
a flume inside a volume defined by the continuous belt screen assembly,
wherein the continuous belt screen assembly is configured to rotate within the tracks and collect solid waste on the lifters that when at the top portion of a rotation cycle invert to cause the solid waste to fall into the flume, and
wherein manipulation of the drive links allow the pair of slots to be rotated and the corresponding screen panel to be removed from the pair of endless belts without removing the corresponding pivot shafts from the endless belts.

16. A method of removing a screen panel from a continuous belt screen assembly for removal of solid waste from fluid in a channel, the continuous belt screen assembly a part of a continuous belt screen system, the continuous belt screen system comprising:
a support structure comprising a pair of spaced, opposing tracks;
a belt screen assembly comprising:
a pair of spaced, opposing endless belts each received in one of the pair of tracks and each endless belt comprising a plurality of drive links, each endless belt being under tension during operation of the belt screen assembly and defining an interior surface and an exterior surface;
a plurality of pivot shafts, each pivot shaft including one end engaging one endless belt and another end engaging the other endless belt, the plurality of pivot shafts connecting adjacent drive links to form the endless belts;
a plurality of lifters, each lifter being pivotally mounted to one of the pivot shafts and configured for lifting of solid waste out of the fluid in the channel wherein each lifter defines two slots parallel to the pivot shafts and on opposite sides of the lifter, such that slots from adjacent lifters open towards each other;
a plurality of screen panels, each screen panel having a length and being interposed between a pair of lifters and secured in place by engagement with the lifters, and wherein the plurality of screen panels is releasably secured in place in the slots between adjacent lifters,
the method comprising:

releasing the tension on the endless belts;
rotating a screen panel, drive links, and lifters defining slots in which the screen panel is received in a direction toward the interior of the endless belts to rotate the slots toward the interior to expose an edge of the panel; and
removing the screen panel from the slots without removing the corresponding pivot shafts from the endless belts.

\* \* \* \* \*